US011370805B2

(12) United States Patent
Lee et al.

(10) Patent No.: US 11,370,805 B2
(45) Date of Patent: *Jun. 28, 2022

(54) COORDINATIVE ALIGNMENT OF MOLECULES IN CHIRAL METAL-ORGANIC FRAMEWORKS

(71) Applicant: The Regents of the University of California, Oakland, CA (US)

(72) Inventors: Seungkyu Lee, Berkeley, CA (US); Eugene A. Kapustin, Berkeley, CA (US); Omar M. Yaghi, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/942,798

(22) Filed: Jul. 30, 2020

(65) Prior Publication Data

US 2020/0354385 A1    Nov. 12, 2020

Related U.S. Application Data

(63) Continuation of application No. 16/270,666, filed on Feb. 8, 2019, which is a continuation of application No. PCT/US2017/045995, filed on Aug. 8, 2017.

(60) Provisional application No. 62/372,309, filed on Aug. 9, 2016.

(51) Int. Cl.
| | | |
|---|---|---|
| C07F 5/06 | (2006.01) | |
| B01D 53/04 | (2006.01) | |
| G01N 23/2202 | (2018.01) | |
| B01J 20/22 | (2006.01) | |

(52) U.S. Cl.
CPC .............. *C07F 5/069* (2013.01); *B01D 53/04* (2013.01); *B01J 20/226* (2013.01); *G01N 23/2202* (2013.01); *C07B 2200/07* (2013.01); *C07B 2200/13* (2013.01)

(58) Field of Classification Search
None
See application file for complete search history.

(56) References Cited

U.S. PATENT DOCUMENTS 10,309,035 B2 *   6/2019  Fujita ....................... C30B 7/06

FOREIGN PATENT DOCUMENTS

JP        WO2015137288     *  9/2015  .............. C30B 7/06

* cited by examiner

*Primary Examiner* — Clinton A Brooks
(74) *Attorney, Agent, or Firm* — Richard Aron Osman

(57) ABSTRACT

Coordinative alignment uses x-ray diffraction to precisely and unambiguously determine the structure of molecules bound or crystallized within chiral metal organic frameworks.

20 Claims, 20 Drawing Sheets

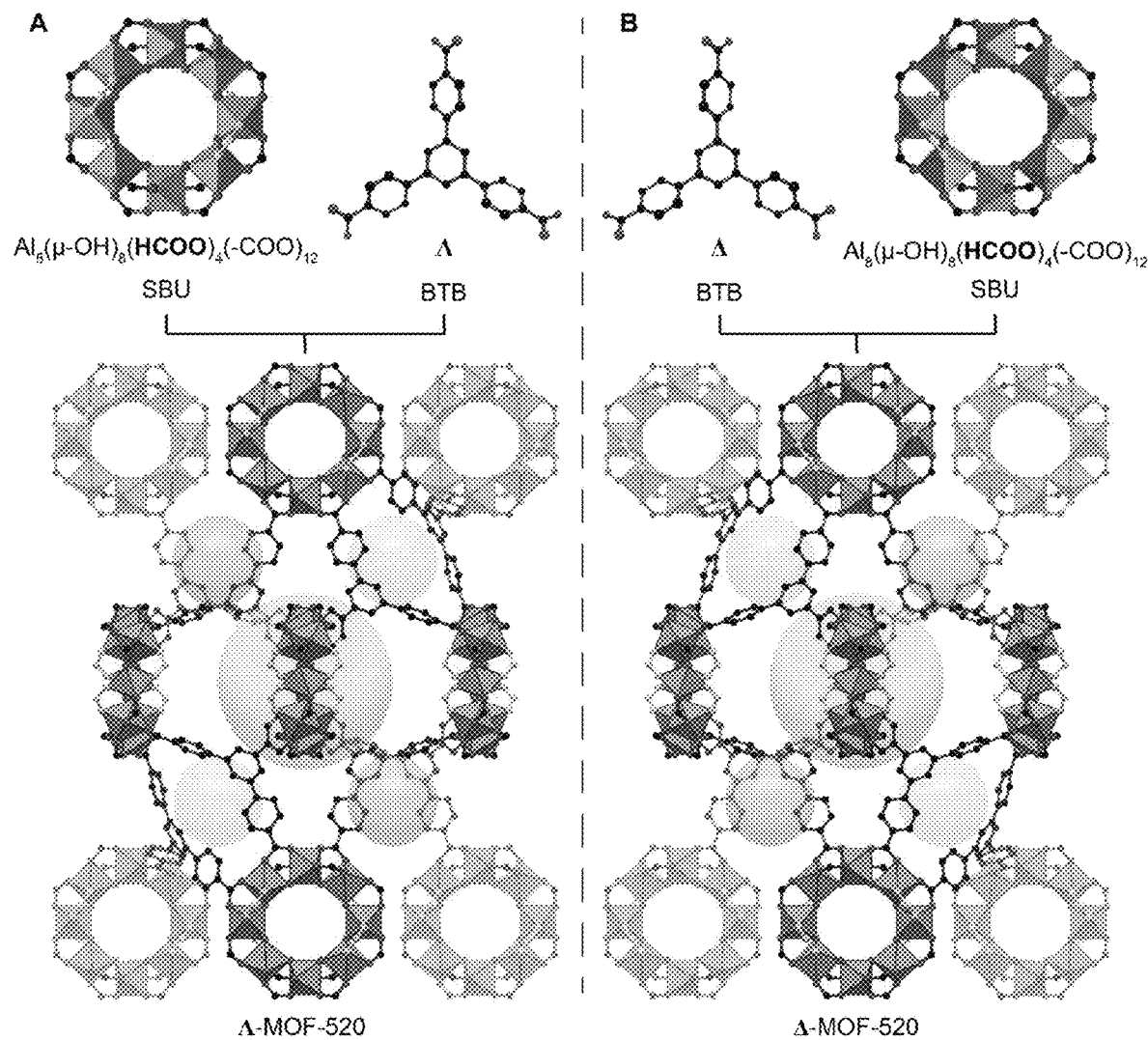
Fig. 1A-B

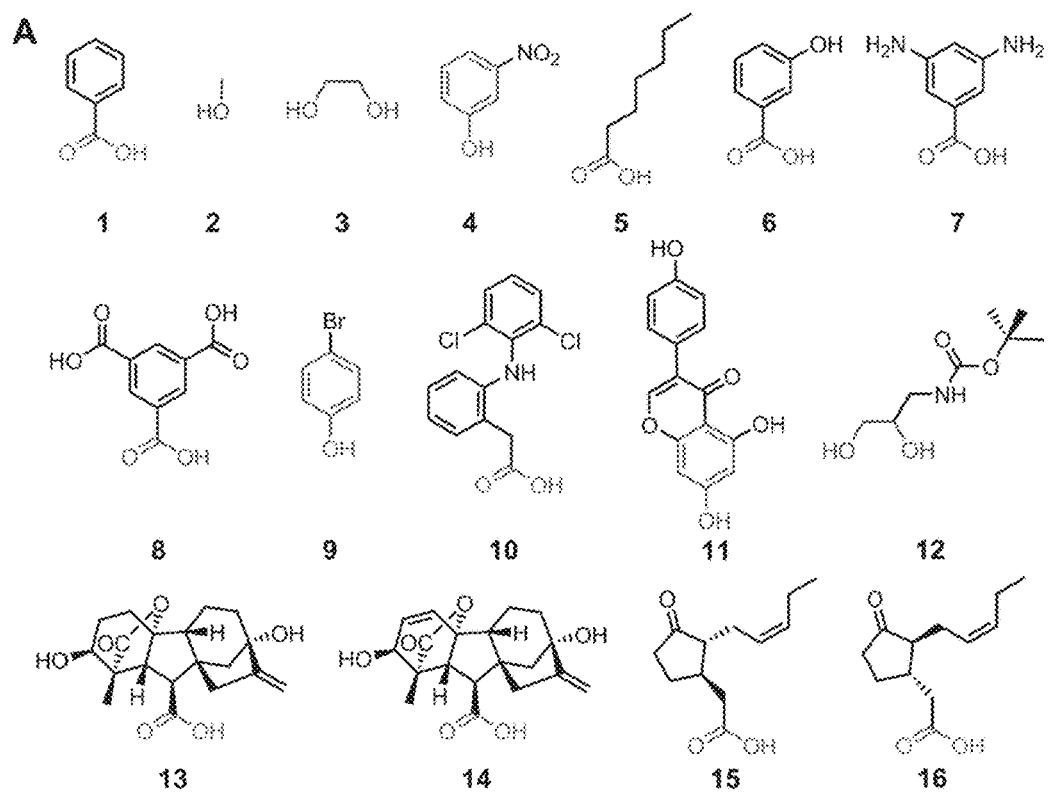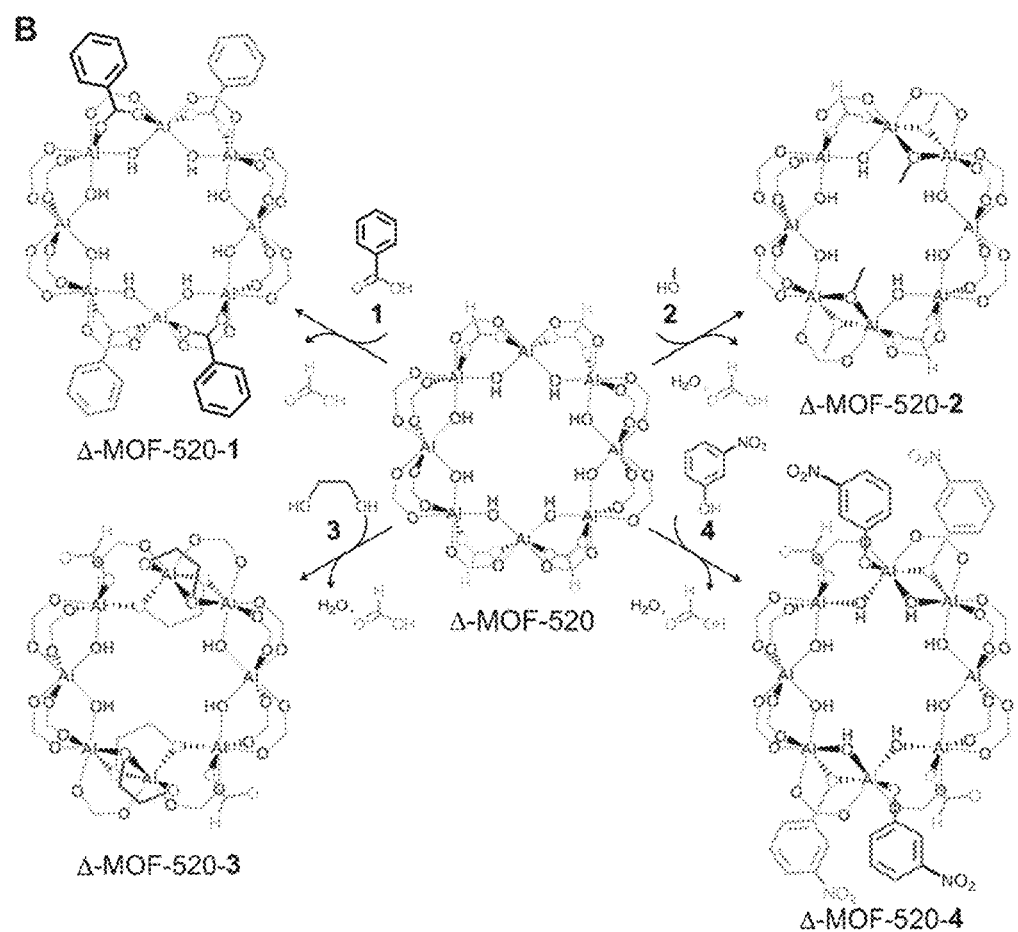
Fig. 2A-B

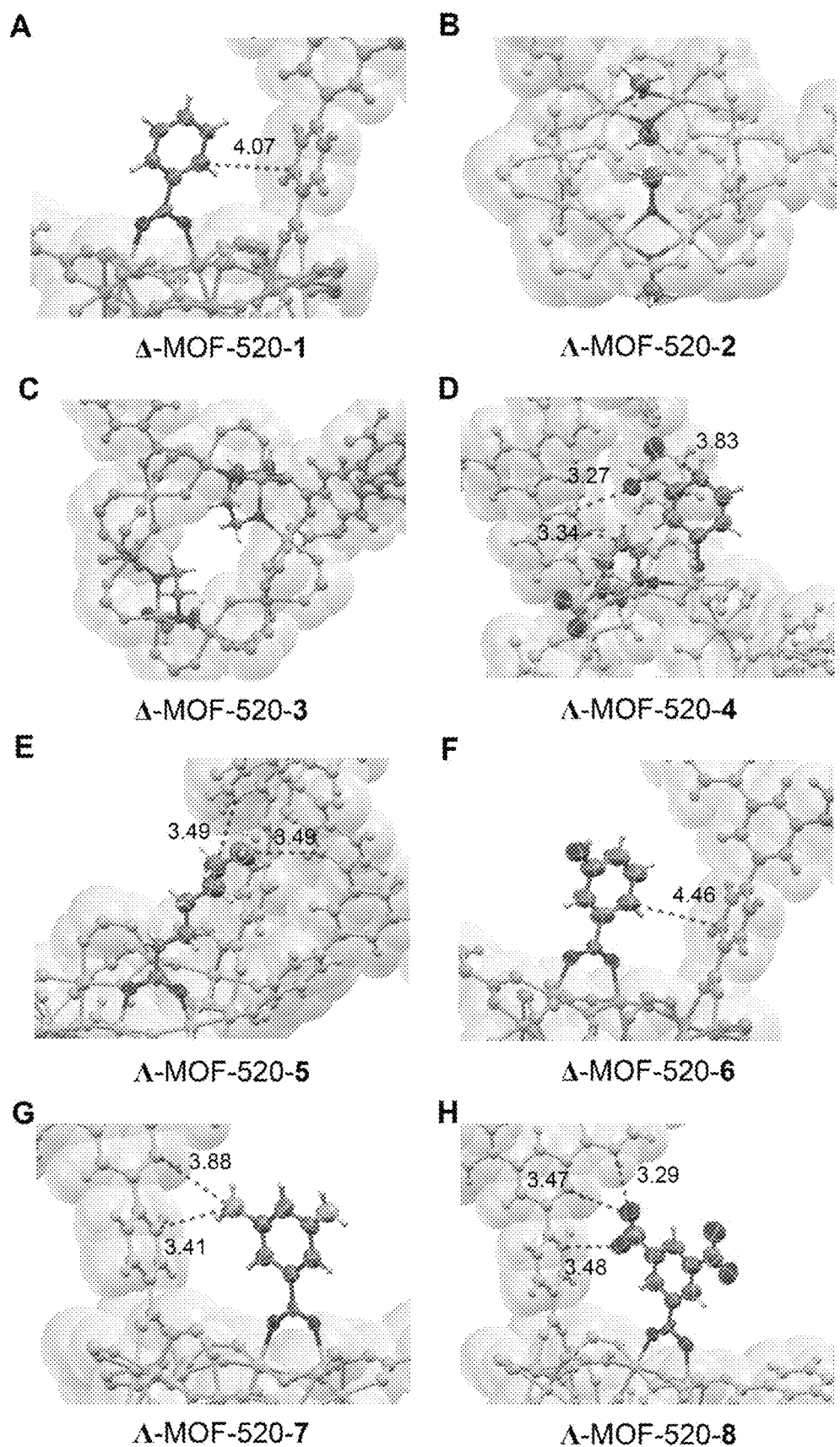
Fig. 3A-H

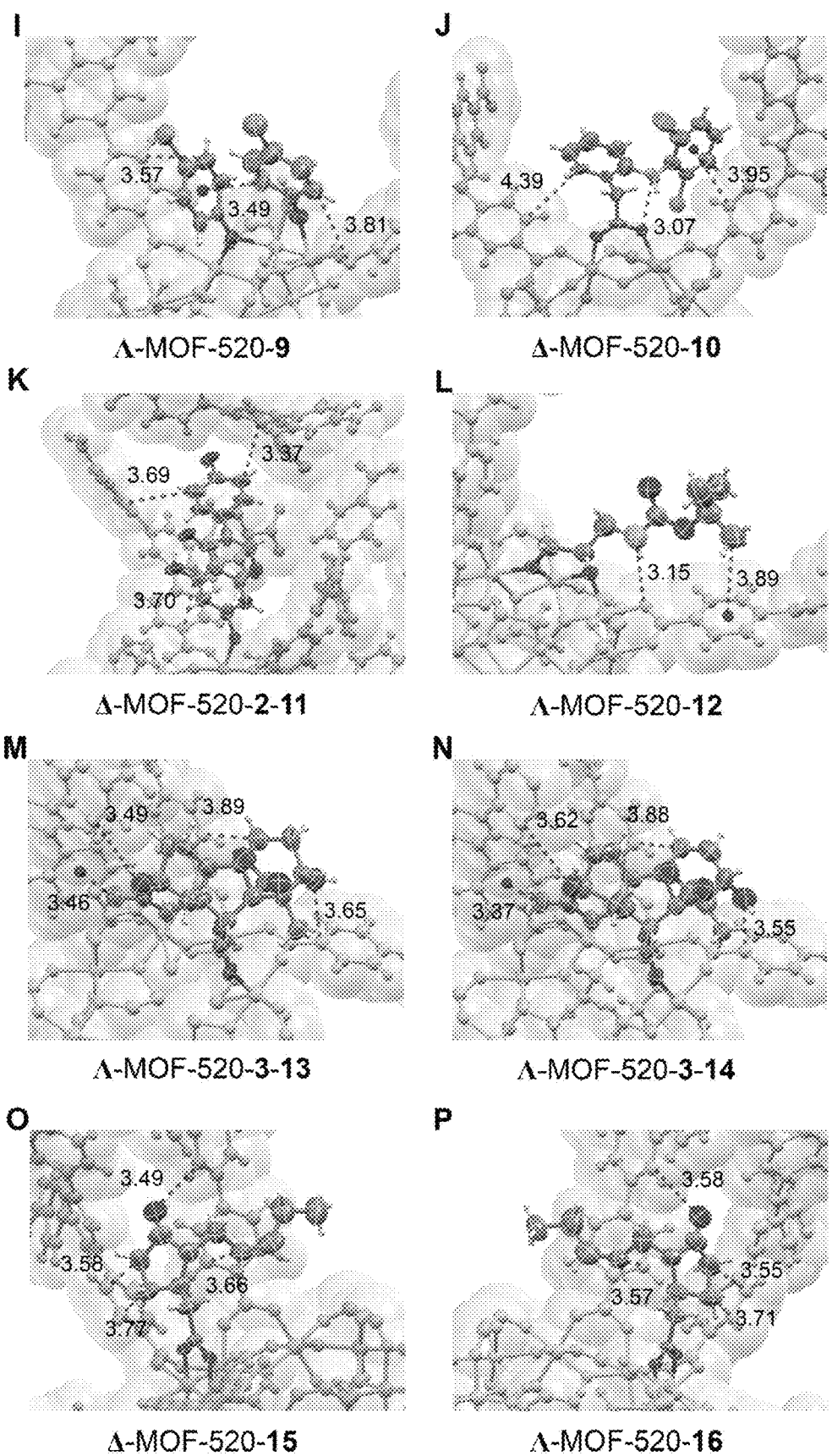
Fig. 3I-P

COORDINATIVE ALIGNMENT OF MOLECULES IN CHIRAL METAL-ORGANIC FRAMEWORKS

INTRODUCTION

Single-crystal x-ray diffraction is a powerful technique for the definitive identification of chemical structures. Although most molecules and molecular complexes can be crystallized, often enthalpic and entropic factors introduce orientational disorder that prevents determination of a high-resolution structure (1). Several strategies based on the inclusion of guests in a host framework (2-4) that helps maintain molecular orientation have been used to overcome this challenge. However, most of these methods rely primarily on weak interactions to induce crystalline order of the included molecules. Here, we demonstrate a strategy for crystallization of molecules within the pores of chiral metal-organic frameworks (MOFs) (5). Advantages of this strategy include: (i) the molecules make covalent bonds to well-defined metal sites of the MOF; these bonds anchor them and lower their motional degrees of freedom, thereby promoting their alignment into an ordered pattern across the interior of the crystalline framework; and (ii) the absolute structure of the chiral MOF framework serves as a reference for the direct determination of the absolute configuration of bound chiral molecules (6). Indeed, this latter feature forgoes the reported pseudo-symmetry problems that have obscured the absolute structures that specify the enantiomorph in achiral host framework systems (7-9).

SUMMARY OF THE INVENTION

The invention provides structural determination of target molecules within metal-organic frameworks using coordinative bonding, which includes covalent and ionic bonds, and/or using chirality.

In one aspect, the invention provides methods for use in diffraction analysis, such as x-ray, neutron, electron diffraction, to determine the structure of target molecules, comprising coordinative aligning the molecules through covalent or ionic bonds within a metal organic framework.

In another aspect the invention provides methods for use in diffraction analysis to determine the absolute configuration of target molecules, comprising crystallizing the molecules within a chiral metal organic framework.

The coordinative bonding and chirality functionalities maybe implemented independently—coordinative bonding for alignment, and chirality for absolute configuration determination—or in conjunction, combining the two advantages. Hence, in another aspect, the invention provides methods for use in diffraction analysis to determine the structure and absolute configuration of target molecules, comprising crystallizing and coordinative aligning the molecules through covalent or ionic bonds within a chiral metal organic framework.

The invention provides material and methods to crystallize organic molecules which cannot be crystallized by conventional crystallization methods. In this new technique called coordinative alignment (CAL) method, organic molecules strongly bind to the interior of metal organic frameworks (MOFs) through covalent and/or ionic bonds, and are oriented in each pore. The structure of the oriented molecules can be precisely determined by diffraction methods like single crystal x-ray diffraction. The reduced vibrations and restricted orientations by the strong bonds enable the precise structure determination by diffraction techniques. This is in contrast to the crystalline sponge method where molecules are oriented through non-covalent interactions, such as van der waals interactions and hydrogen bonds. This non-covalent method requires multiple interactions between the molecules and the framework to have enough stabilization energy, and this multiple requirement limits the scope of molecules.

Another aspect of this invention is that chiral symmetry of the MOFs used serves as a reference for determining the absolute configuration of the bound molecules during the structure refinement procedure. This is in contrast to a previous method, the crystalline sponge method, which depends on the distortion of achiral frameworks induced by guest molecules. This distortion method limits the scope of molecules, which can be applied to the sponge method, to the molecules that distort the framework and have high occupancies to have enough anomalous x-ray scattering.

The invention remarkably and unexpectedly can provide precise, unambiguous and/or absolute structure determination, including distinguishing single and double bonds in organic molecules, in the frequently low inclusion occupancy of molecules in MOFs.

Coordinative (strong covalent or ionic bond) alignment of molecules in single crystalline chiral metal organic frameworks for the precise structure determination is achieved by the restricted motional degree of freedom of the strongly bound molecules. The strongly bound molecules are oriented and aligned in long range order in pores of the MOFs. Diffraction techniques such as X-ray, electron, and neutron diffraction are then used for the structure determination of the bound molecules since they are aligned and crystalline in MOFs.

The chirality of the frameworks provides a reference during the structure refinement procedure for absolute structure determination of chiral molecules bound unambiguously with the precision and reliability, which cannot be achieved by other spectroscopies and crystallization methods.

Also, the chiral environment of the pore enables enantioselective crystallization of the incoming molecules in the pores, which can be applied to crystallize one enantiomer from a recemic mixture.

The methods may be implemented with a wide variety of MOFs, and suitable MOFs are readily selected by those skilled in the art, based target molecule to be structurally determined, conditions and availability, etc., and/or may be confirmed empirically. Generally, the MOFs should be big enough single crystals, so that the crystals diffract enough for the structure determination. The MOFs should provide functionalities that can interact strongly with incoming molecules, including open metal sites and organic functional groups which can make covalent bond with incoming molecules. And the MOFs should be chiral. The precision of the absolute configuration determination of bound molecules in achiral MOFs depends on factors such as occupancy, degree of chirality of the molecules. In the example below we chose MOF-520 as the framework for initially implementing the CAL method of crystallization because of its high crystallinity, robustness, and chirality.

For coordinative alignment, introducing open metal sites and organic functional groups, which can interact with incoming molecules through covalent or ionic bonds, to MOFs are common to MOFs generally. However, the crystal size should large enough to show diffraction. Exemplary MOFs with particularly suitable functionalities and size include MOF-74, MOF-808, PCN-700, MOF-545, and MOF-535.

For chirality of MOFs for the absolute configuration determination of the molecules crystallized in MOFs, any MOFs with chiral symmetry and the crystal size large enough to show diffraction can be used for the unambiguous absolute structure determination. Exemplary MOFS with particularly suitable functionalities include chiral MOF-5 and MOFs based on mandelate, such as $[CO_2(R\text{-man})_2(bpy)_3](NO_3)_2$. In MOFs field, the size of crystals can be grown by optimizing the synthesis conditions, which are common and general.

The invention encompasses all combination of the particular embodiments recited herein, as if each combination had been laboriously recited.

DESCRIPTION OF THE DRAWINGS

FIG. 1A-B. Structures of MOF-520 enantiomorphs and their building units. MOF-520 is comprised of the SBU, $Al8(\mu\text{-OH})8(HCOO)4(\text{-COO})12$ and BTB linker. Each SBU is coordinated by sixteen carboxylates, twelve from BTB linkers and four from formate ligands (highlighted in yellow on the SBU). The absolute structure descriptors $\Lambda$-MOF-520 (A) and $\Delta$-MOF-520 (B) are assigned based on the absolute configuration of the BTB linker. The large yellow and small orange balls represent the octahedral and tetrahedral pores, respectively. Color code: black, C; red, O; blue polyhedra, Al.

FIG. 2A-B. Structures of incoming molecules (1 to 16) and coordination modes of their deprotonated forms on the SBU of $\Delta$-MOF-520. (A) The structures of 1 to 16 represent the molecules binding to the SBU, where their functionalities are highlighted with colors: red for carboxylic acid, purple for primary alcohol, green for vicinal diol, and blue for phenol. (B) The SBU of $\Delta$-MOF-520 is shown in the center with the four formate ligands (yellow) highlighted. The deprotonated forms of 1 to 4 replace all (1) or some (2-4) of the formate ligands and $\mu$-OH on the SBU; the resulting coordination modes and the functionalities of the molecules are colored. For clarity, the chirality of $\Lambda$-MOF-520-2 and -4 are converted to $\Delta$ configuration.

FIG. 3A-P. Refined structures of 1 to 16 crystallized in $\Lambda$ or $\Delta$-MOF-520. (A to P) The refined structures of the molecules obtained from SXRD data are indicated with 50% probability thermal ellipsoids. The surroundings of the coordination sites of $\Lambda$- and $\Delta$-MOF-520 are shown with orange and blue space filling models, respectively. Intramolecular interactions between the moieties of the molecules and the surroundings of the coordination sites are indicated with dotted lines and distances (Å). In the case of positional disorder, only one conformation of bound molecules is shown for clarity. Color code: gray, C; red, O; white, H; pale violet, N; green, Cl; brown, Br.

DESCRIPTION OF PARTICULAR EMBODIMENTS OF THE INVENTION

Figure 4:
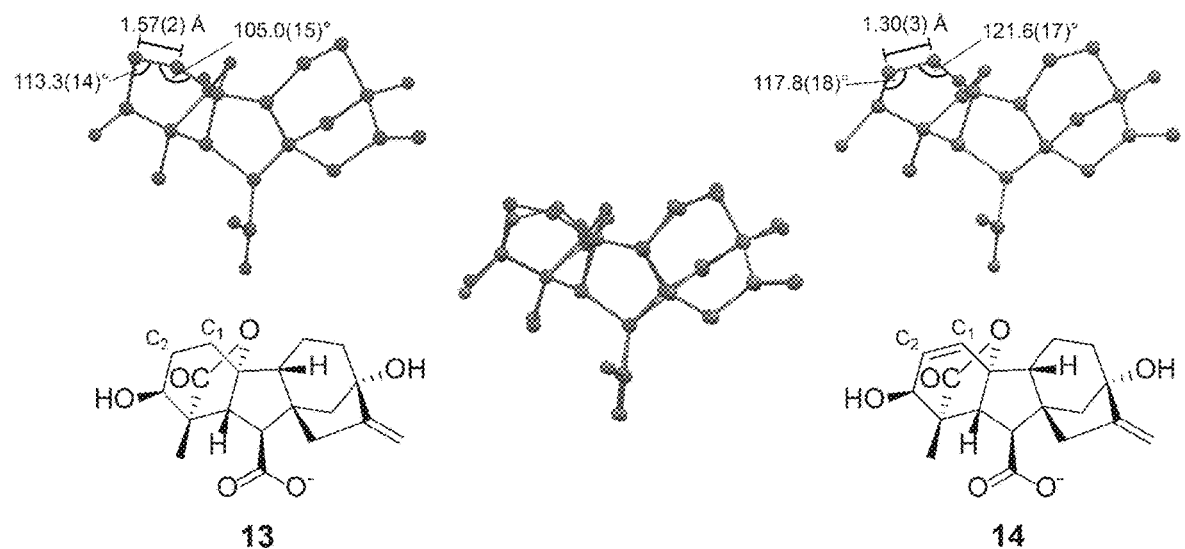
FIG. 4. Comparison of the molecular geometries of 13 and 14. Ball-and-stick models of the structures of 13 and 14 crystallized in $\Lambda$-MOF-520 are shown in red and blue, respectively. Their conformations are overlaid in the middle. The structural difference, a single bond between $C_1$ and $C_2$ for 13 and a double bond for 14, can be distinguished from the distances and the angles indicated on the models. Only atoms $C_1$ and $C_2$ are labeled for clarity.
Figure 5:
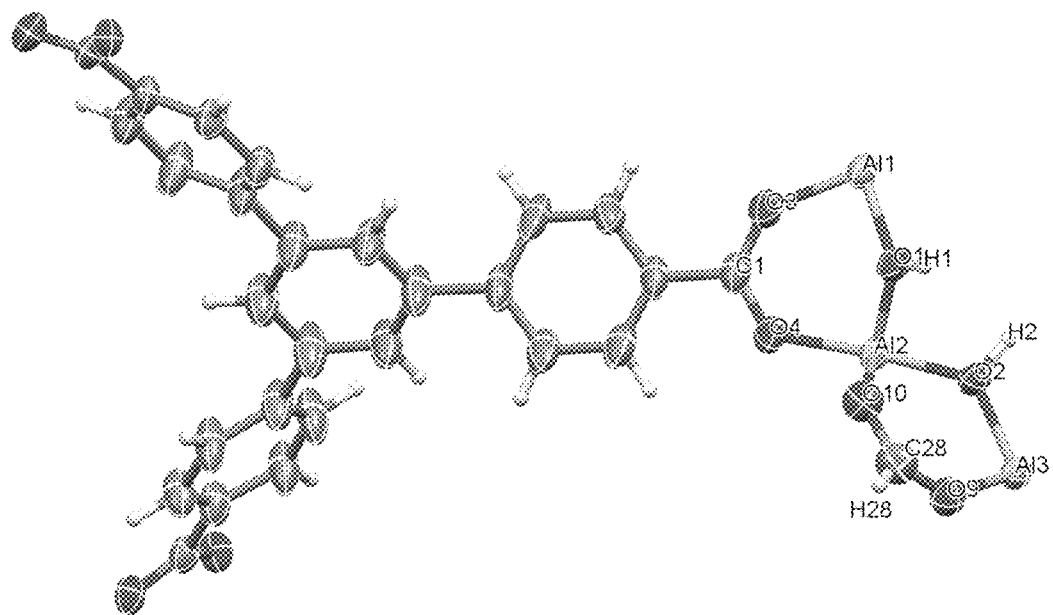
FIG. 5. Asymmetric unit in the single crystal structure of $\Lambda$-MOF-520. Thermal ellipsoids are drawn with 50% probability.
Figure 6:
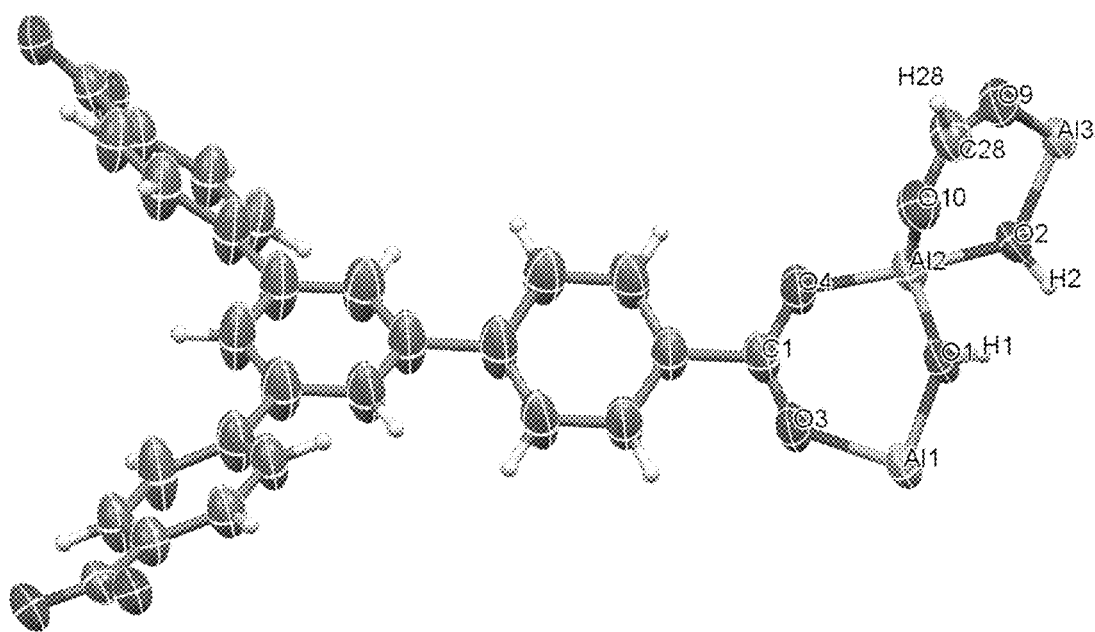
FIG. 6. Asymmetric unit in the single crystal structure of $\Delta$-MOF-520. Thermal ellipsoids are drawn with 50% probability.
Figure 7:
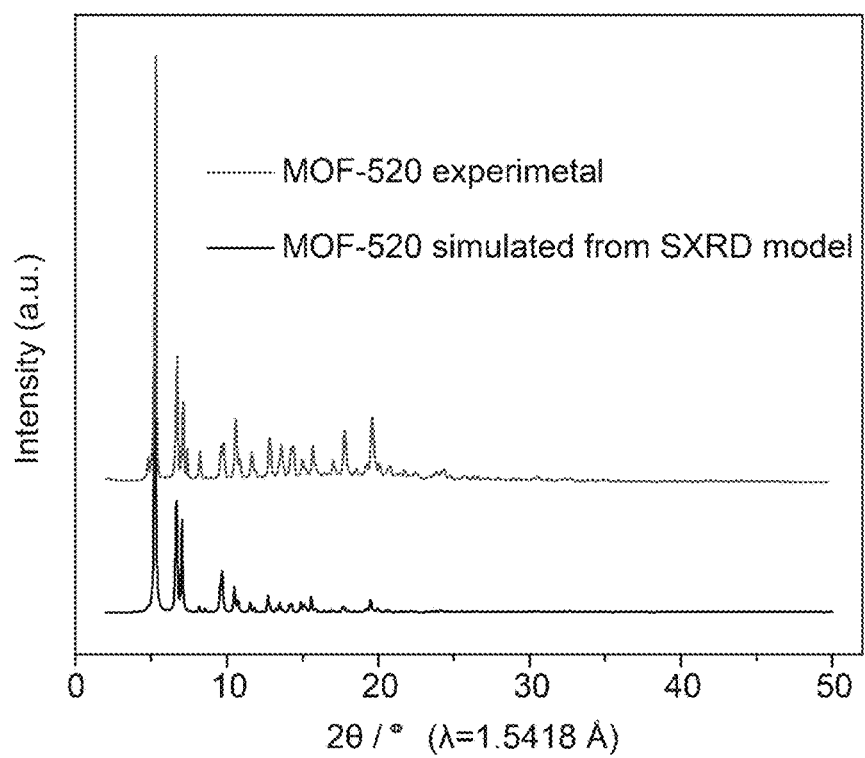
FIG. 7. PXRD pattern of MOF-520 and the simulated pattern of MOF-520 structure from SXRD data.
Figure 8:
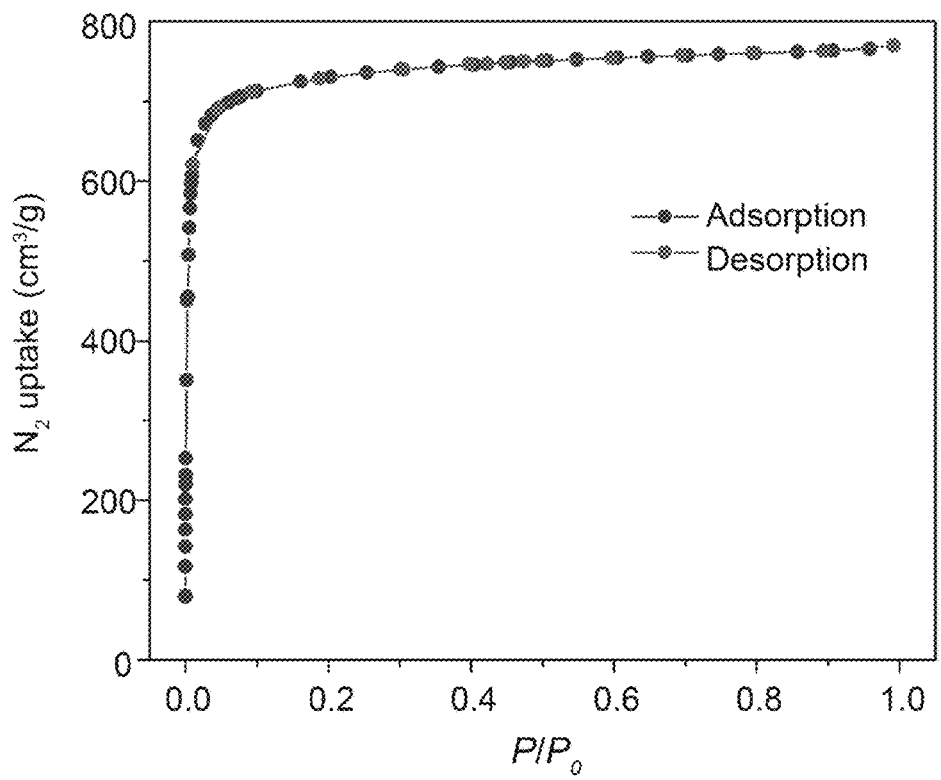
FIG. 8. $N_2$ isotherm of MOF-520 at 77K.
Figure 9:
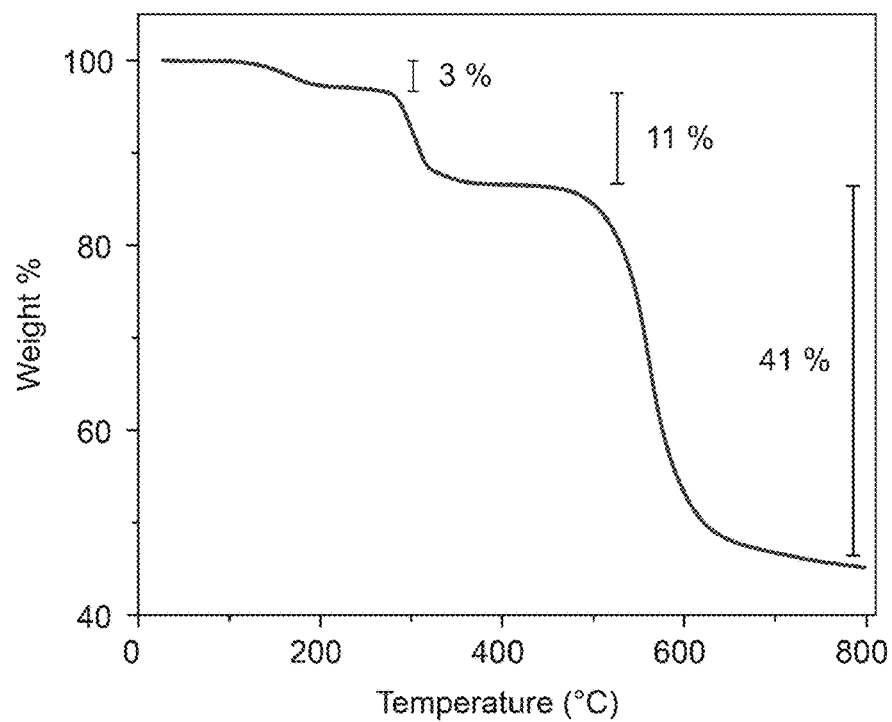
FIG. 9. TGA data of the guest free MOF-520.
Figure 10:
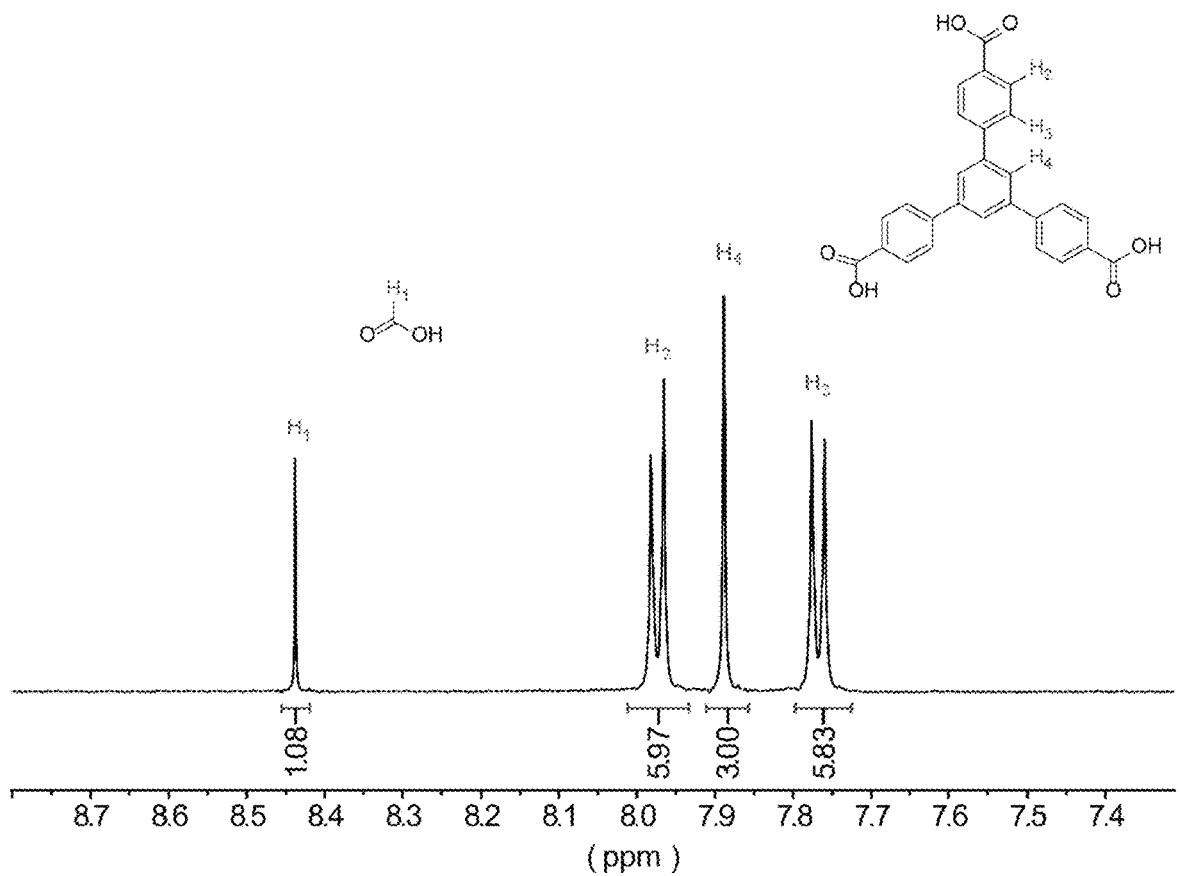
FIG. 10. $^1$H NMR data of digested guest free MOF-520 in $d_6$-DMSO.
Figure 11:
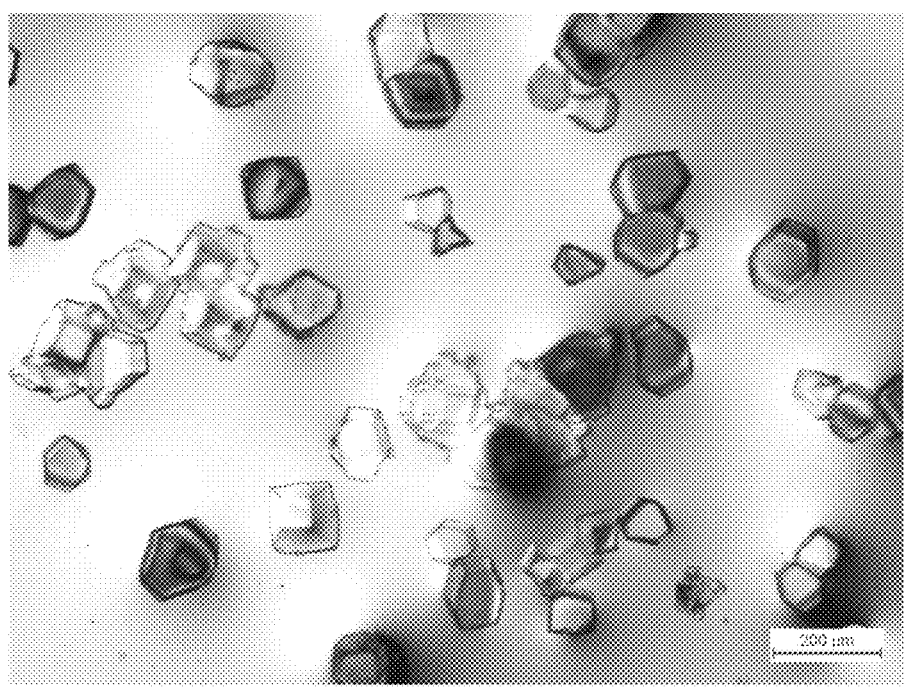
FIG. 11. As-synthesized MOF-520 single crystals image obtained from optical microscope under polarized light.
Figure 12:
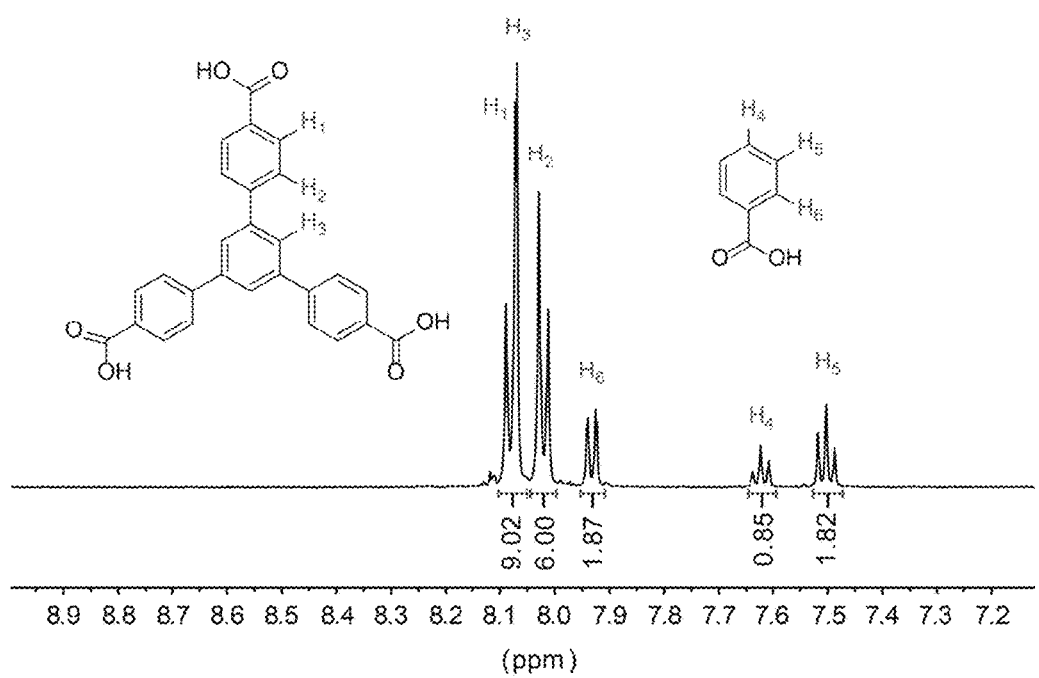
FIG. 12. $^1$H NMR data of digested guest free MOF-520-1 in $d_6$-DMSO.
Figure 13:
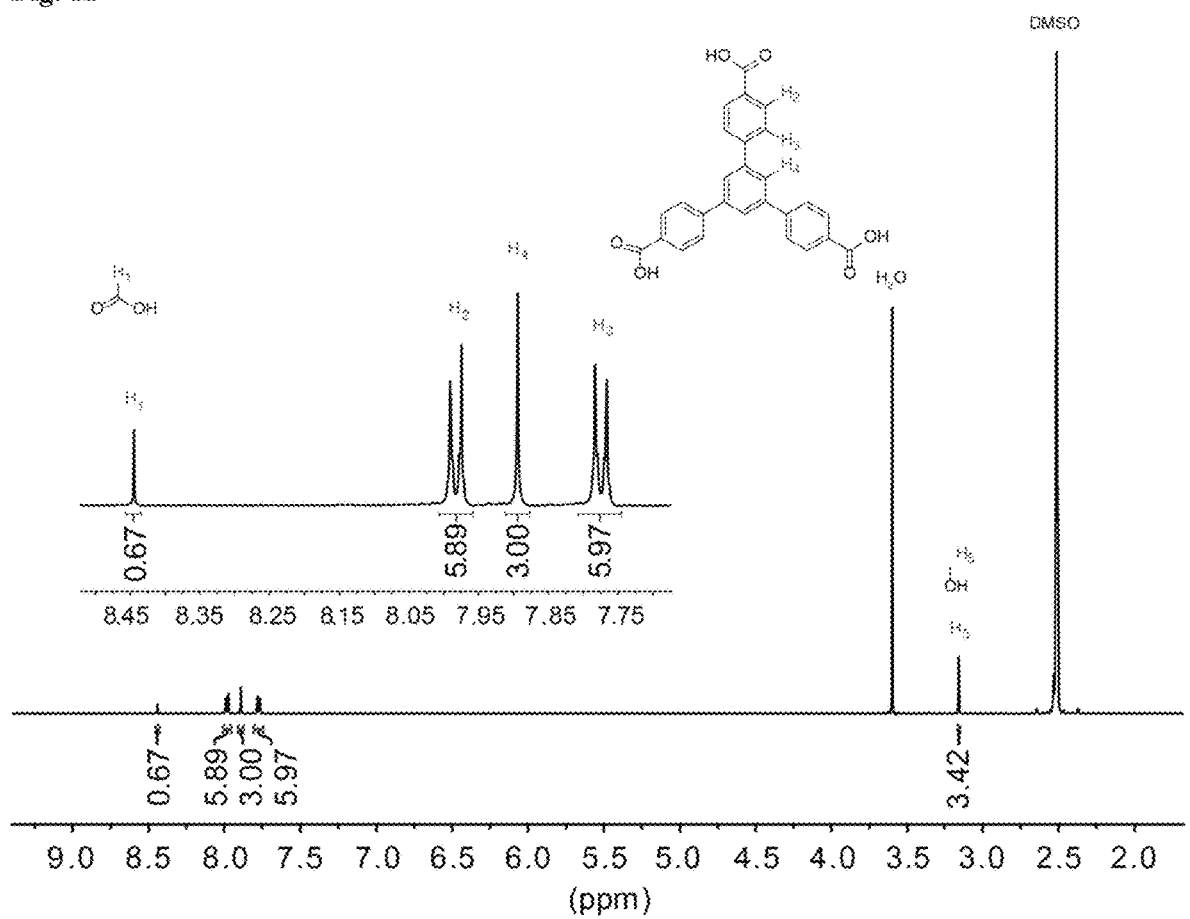
FIG. 13. $^1$H NMR data of digested guest free MOF-520-2 in $d_6$-DMSO.
Figure 14:
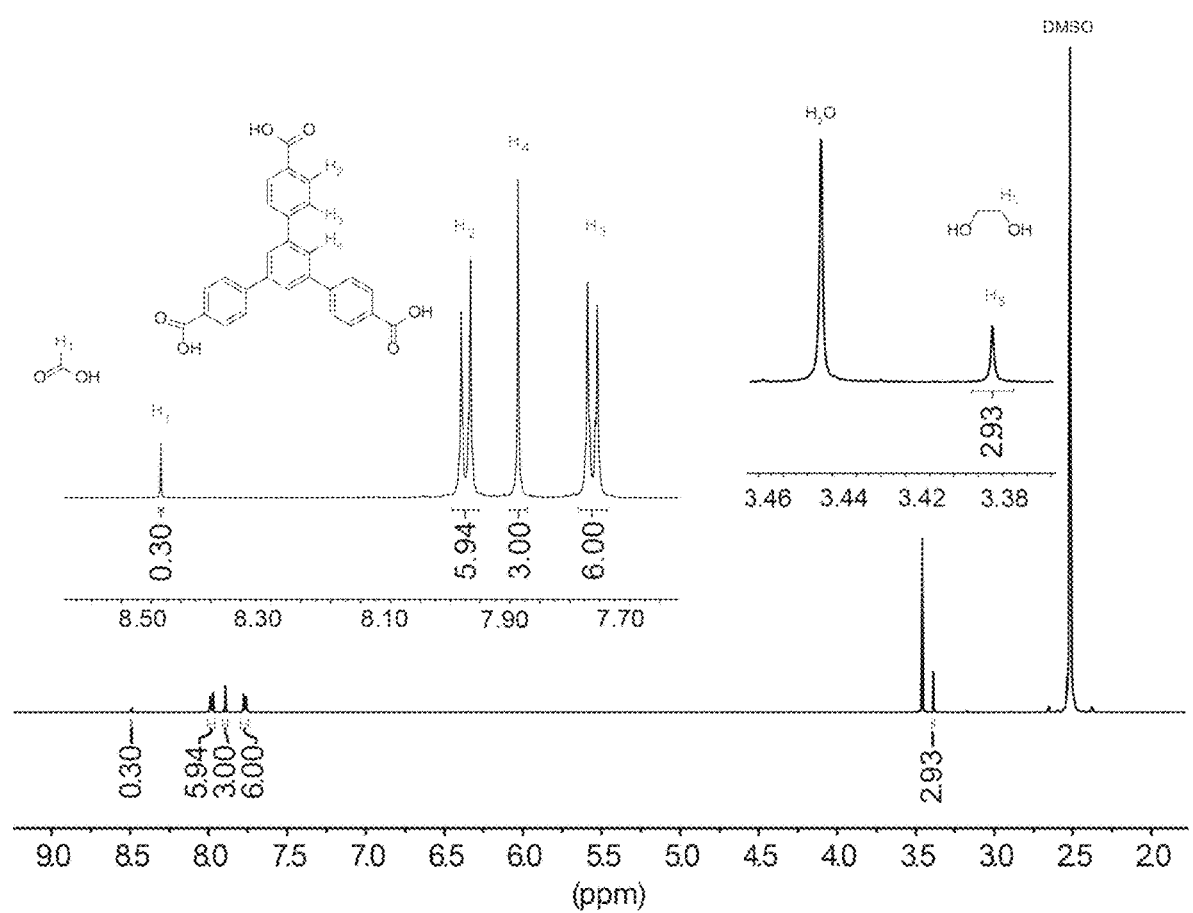
FIG. 14. $^1$H NMR data of digested guest free MOF-520-3 in $d_6$-DMSO.
Figure 15:
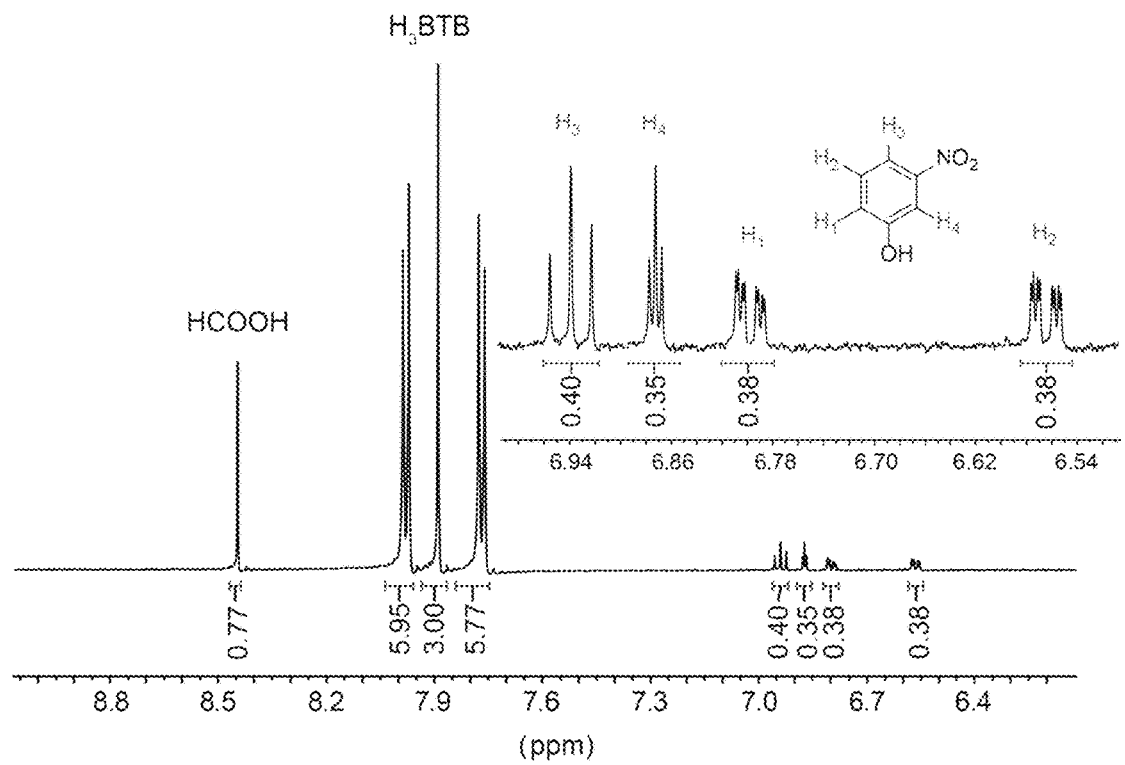
FIG. 15. $^1$H NMR data of digested guest free MOF-520-4 in $d_6$-DMSO.
Figure 16:
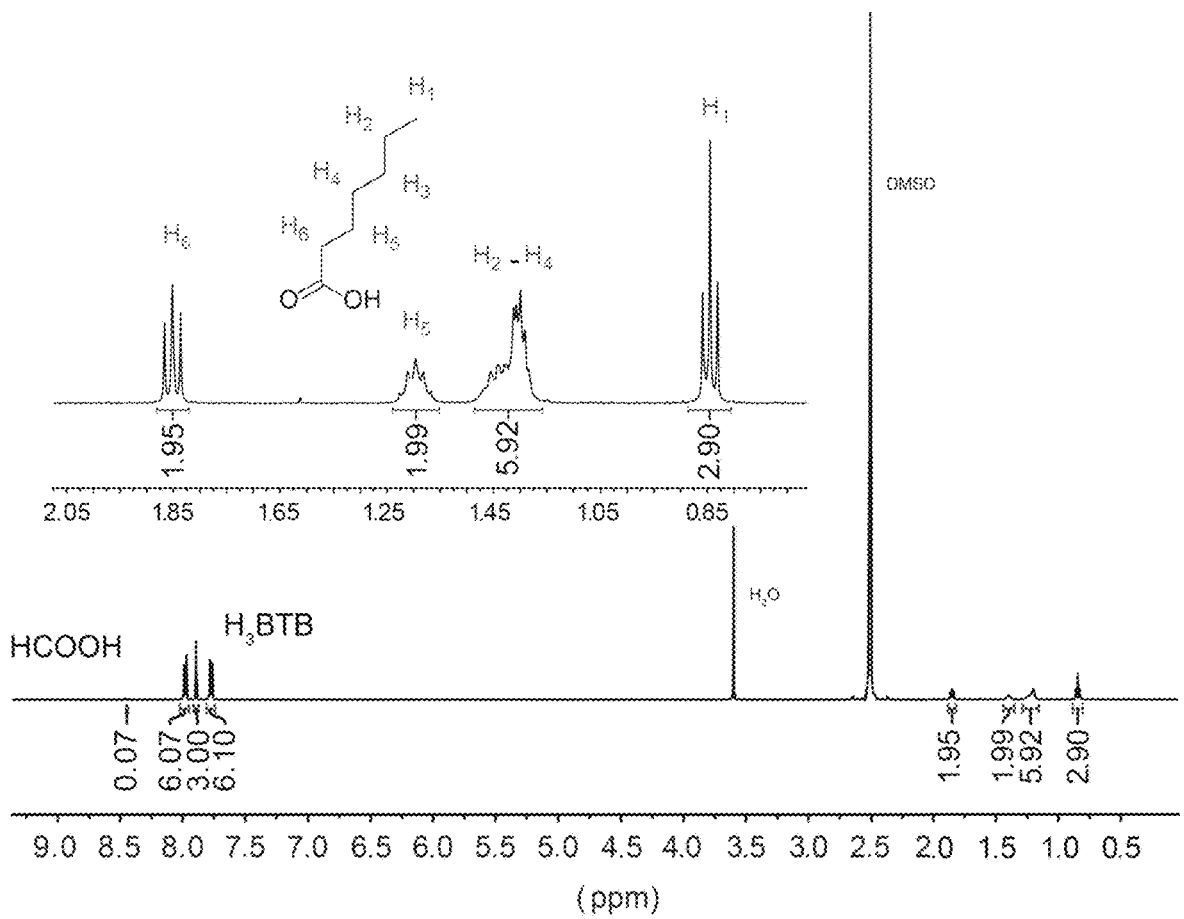
FIG. 16. $^1$H NMR data of digested guest free MOF-520-5 in $d_6$-DMSO.
Figure 17:
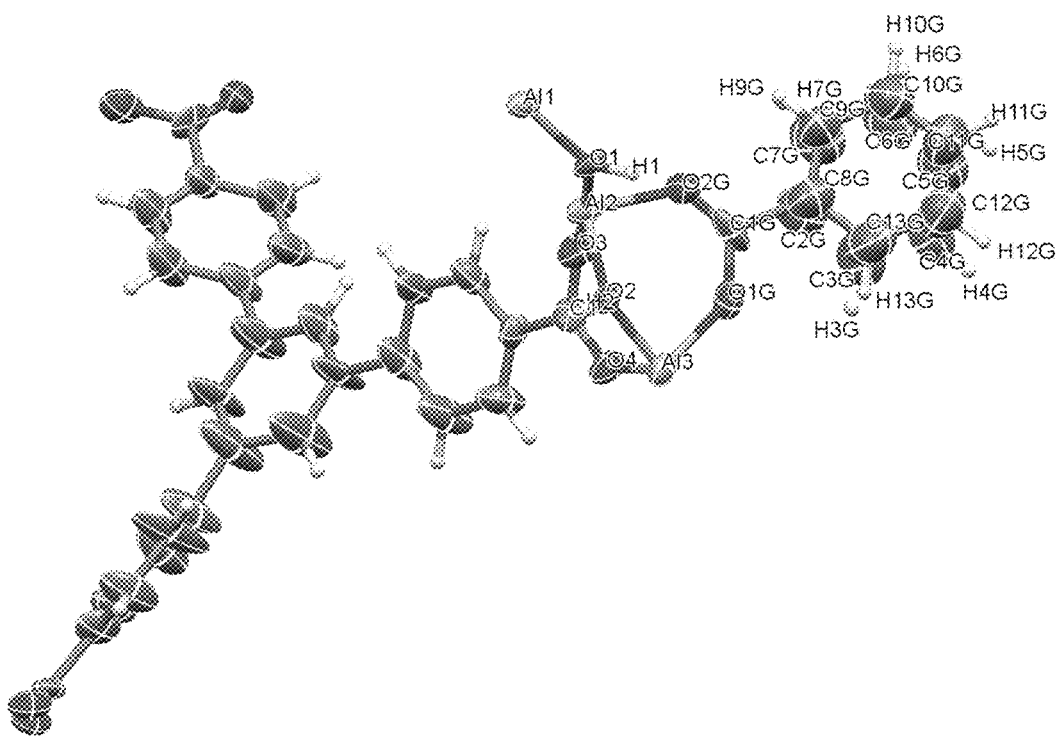
FIG. 17. Asymmetric unit in the single crystal structure of $\Delta$-MOF-520-1. Thermal ellipsoids are drawn with 50% probability.
Figure 18:
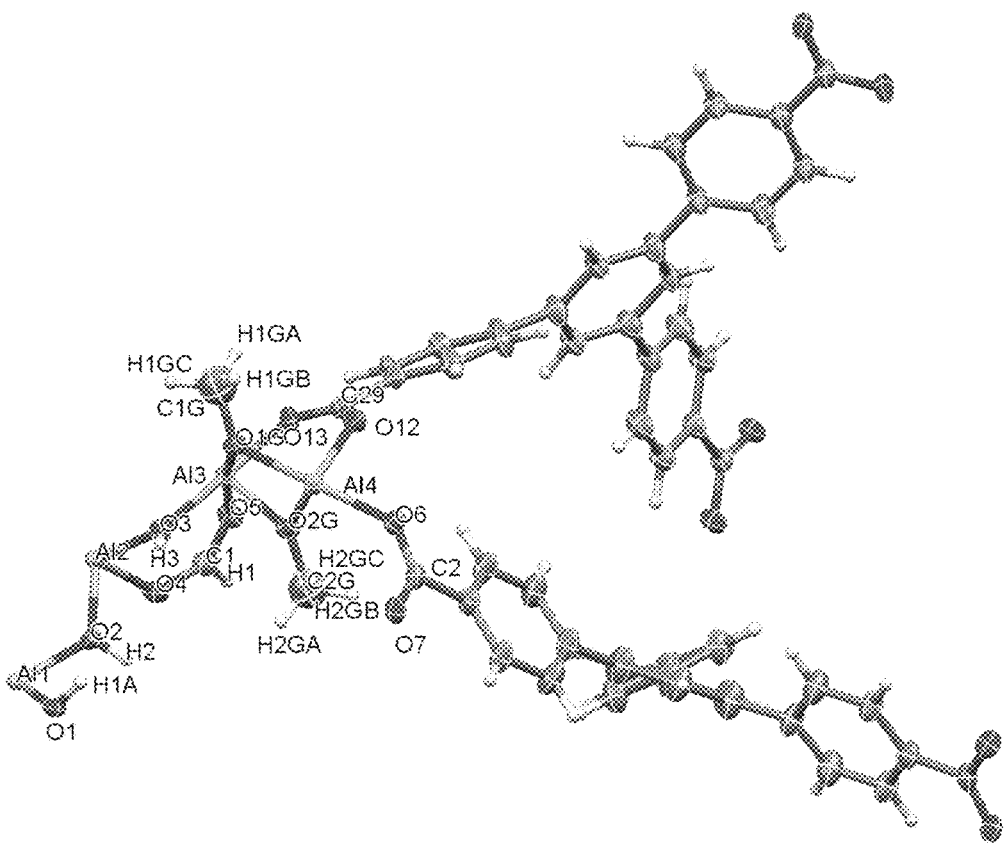
FIG. 18. Asymmetric unit in the single crystal structure of $\Lambda$-MOF-520-2. Thermal ellipsoids are drawn with 50% probability.
Figure 19:
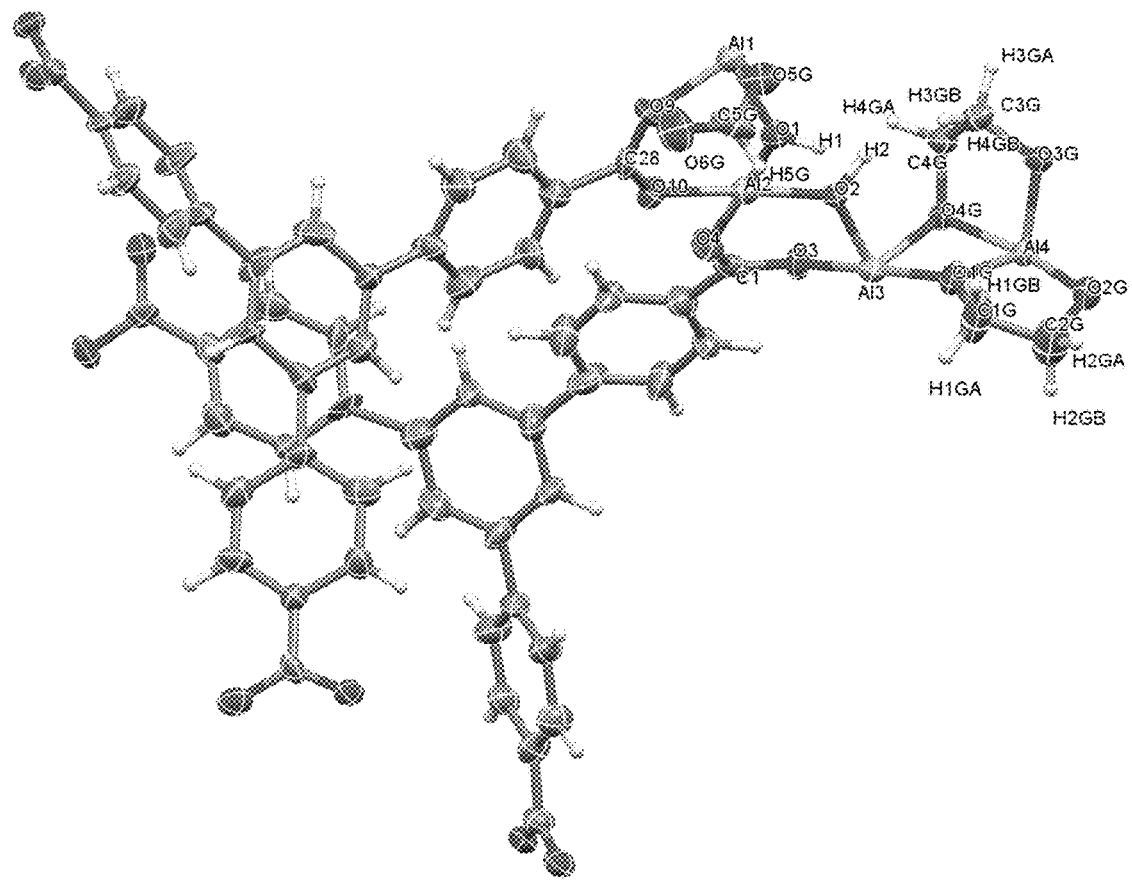
FIG. 19. Asymmetric unit in the single crystal structure of $\Delta$-MOF-520-3. Thermal ellipsoids are drawn with 50% probability.
Figure 20:
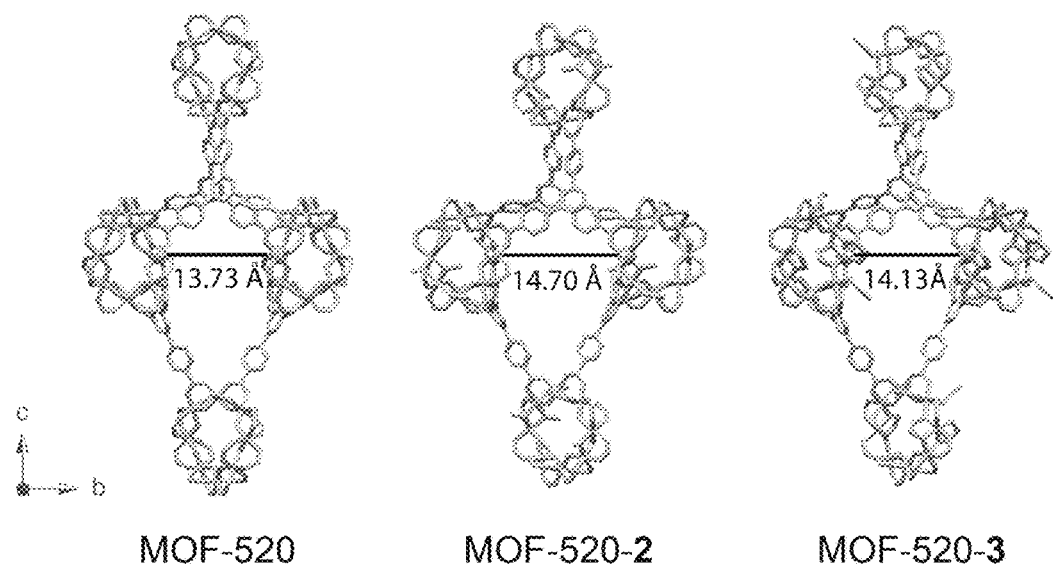
FIG. 20. Channel width comparison between MOF-520, MOF-520-2, and -3. The frameworks are indicated with gray stick models and the Al on adjacent SBUs are indicated with blue sphere. MOF-520 was used for the crystallization of incoming molecules 1 to 10, 12, 15, and 16; MOF-520-2 for 11 (the molecule 11 is 12.68 Å along its longest dimension); MOF-520-3 for 13 and 14 (the molecules 13, 14 are 10.20 Å along their longest dimensions).
Figure 21:
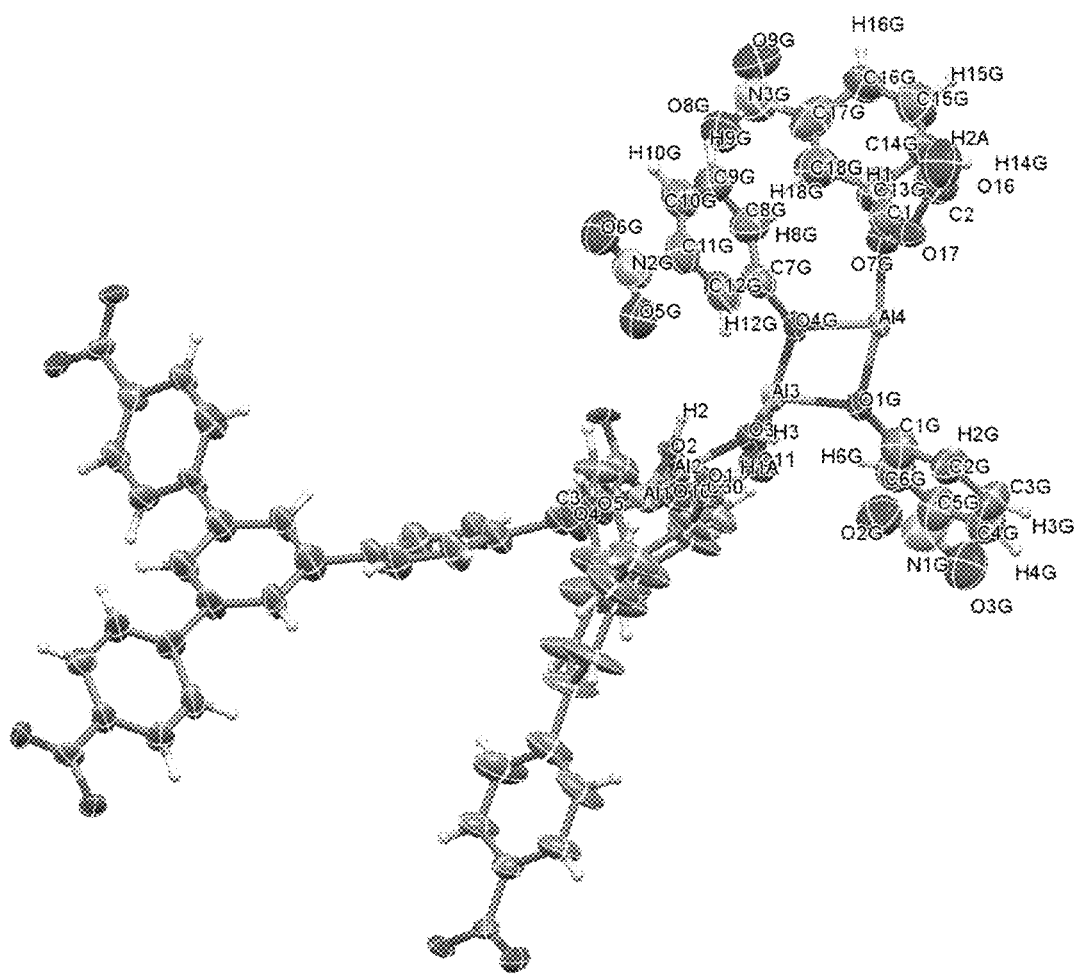
FIG. 21. Asymmetric unit in the single crystal structure of $\Lambda$-MOF-520-4. Thermal ellipsoids are drawn with 50% probability.
Figure 22:
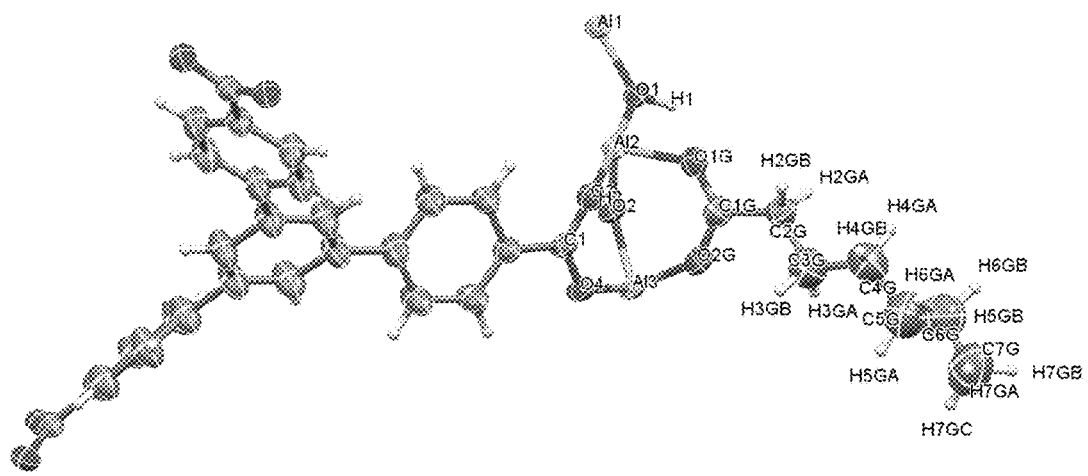
FIG. 22. Asymmetric unit in the single crystal structure of $\Lambda$-MOF-520-5. Thermal ellipsoids are drawn with 50% probability.
Figure 23:
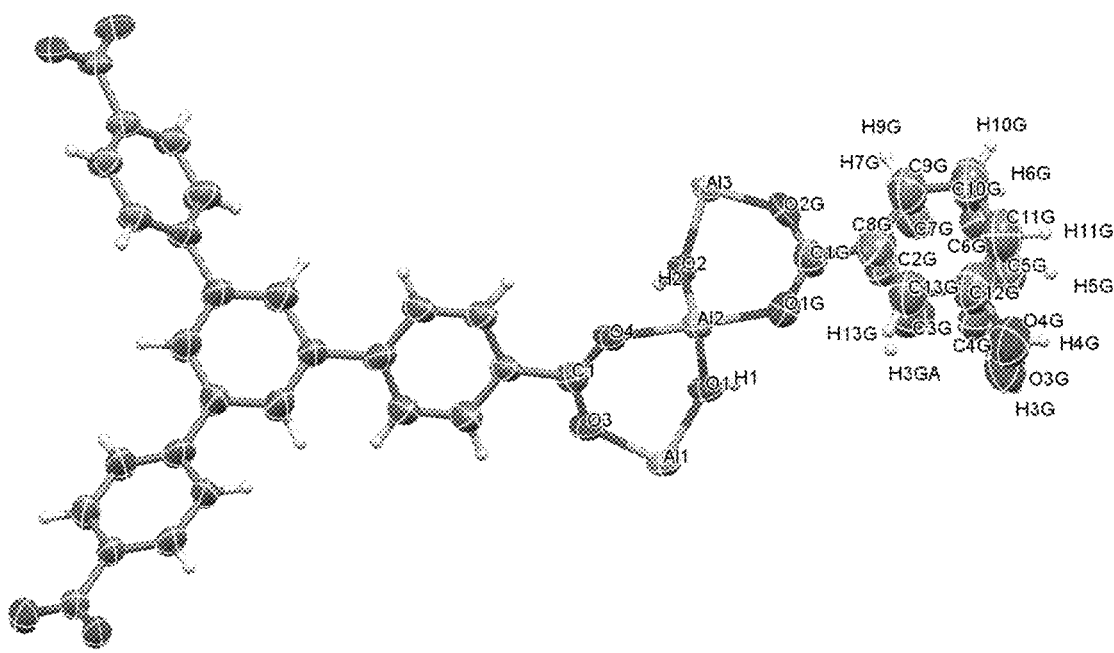
FIG. 23. Asymmetric unit in the single crystal structure of $\Delta$-MOF-520-6. Thermal ellipsoids are drawn with 50% probability.
Figures 24, 25:
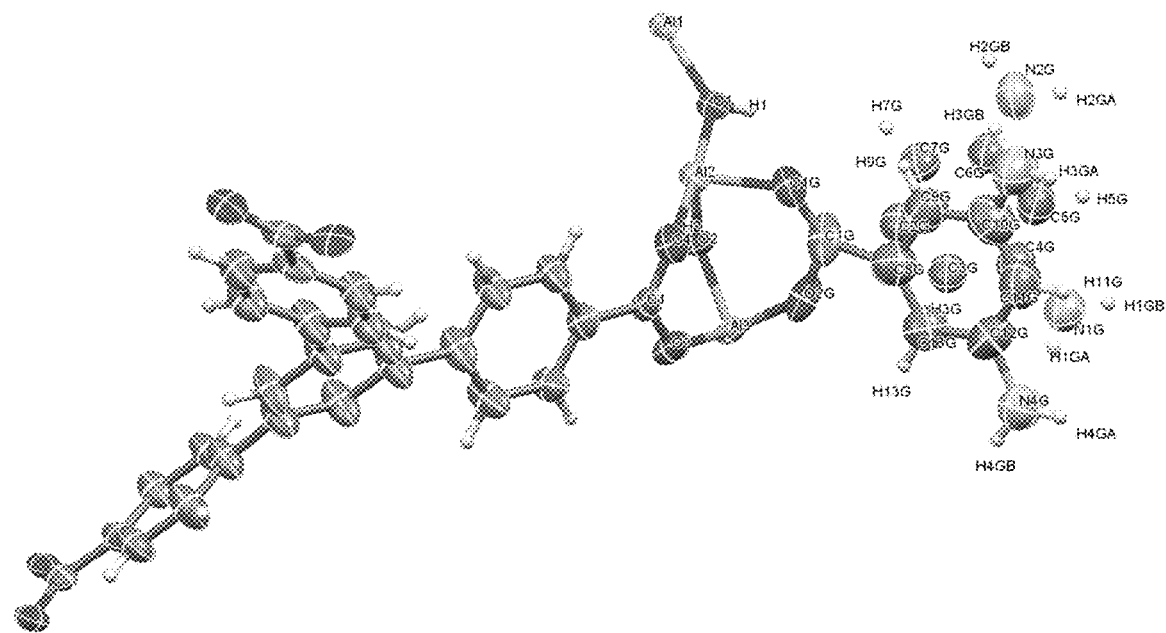
FIG. 24. Asymmetric unit in the single crystal structure of $\Lambda$-MOF-520-7. Thermal ellipsoids are drawn with 50% probability.
FIG. 25. Asymmetric unit in the single crystal structure of $\Lambda$-MOF-520-8. Thermal ellipsoids are drawn with 50% probability.
Figure 26:
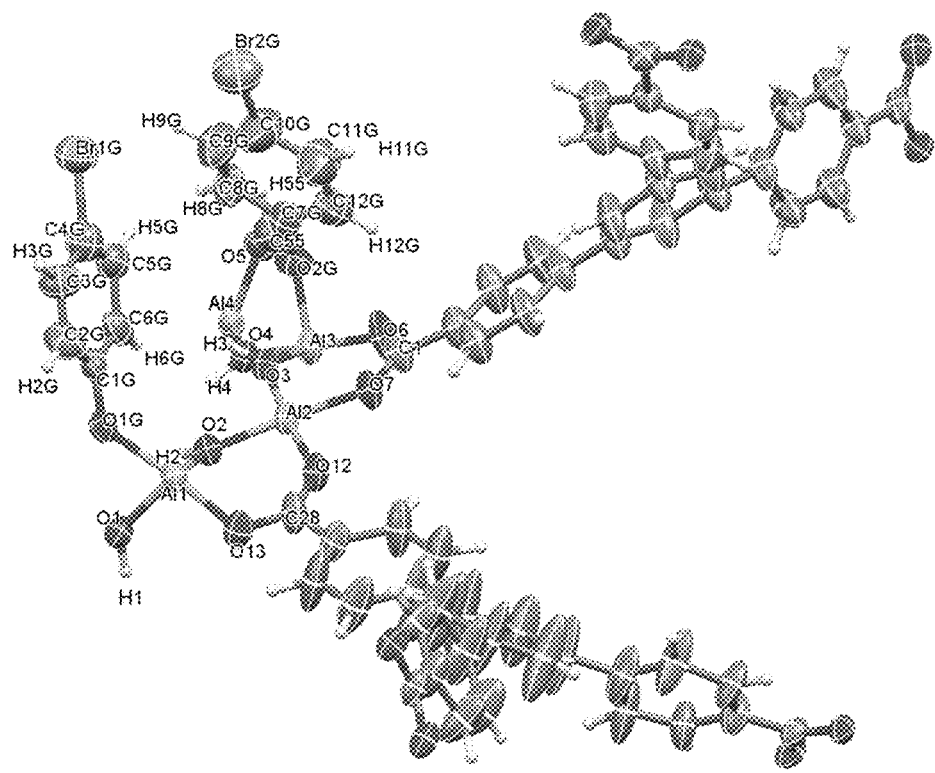
FIG. 26. Asymmetric unit in the single crystal structure of $\Lambda$-MOF-520-9. Thermal ellipsoids are drawn with 50% probability.
Figure 27:
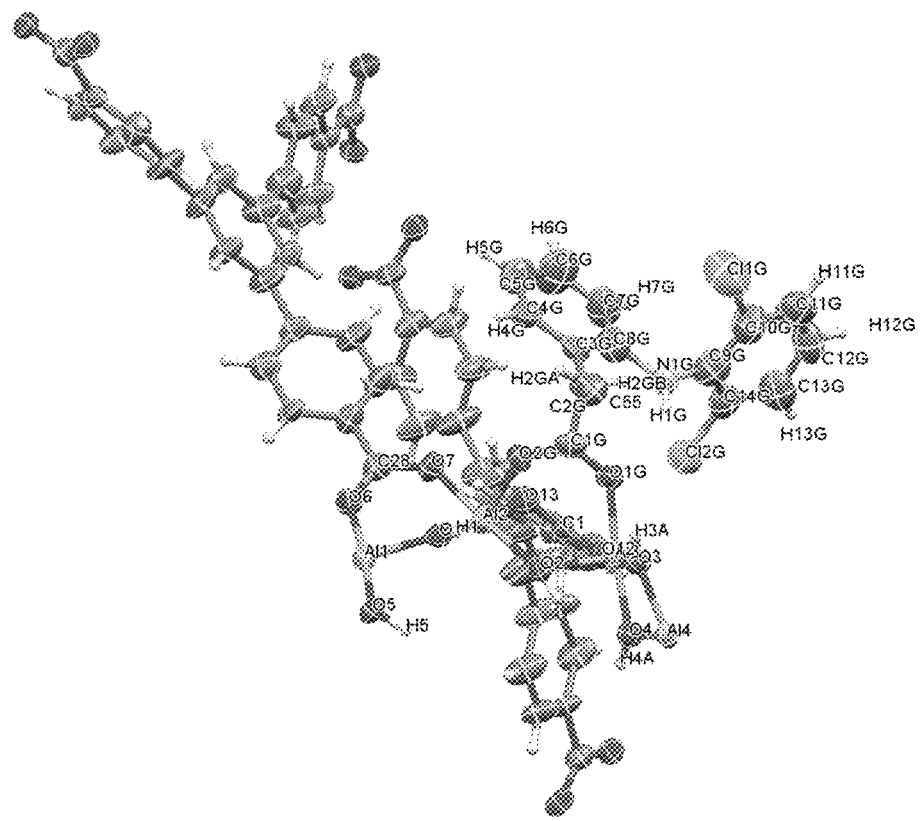
FIG. 27. Asymmetric unit in the single crystal structure of $\Delta$-MOF-520-10. Thermal ellipsoids are drawn with 50% probability.
Figure 28:
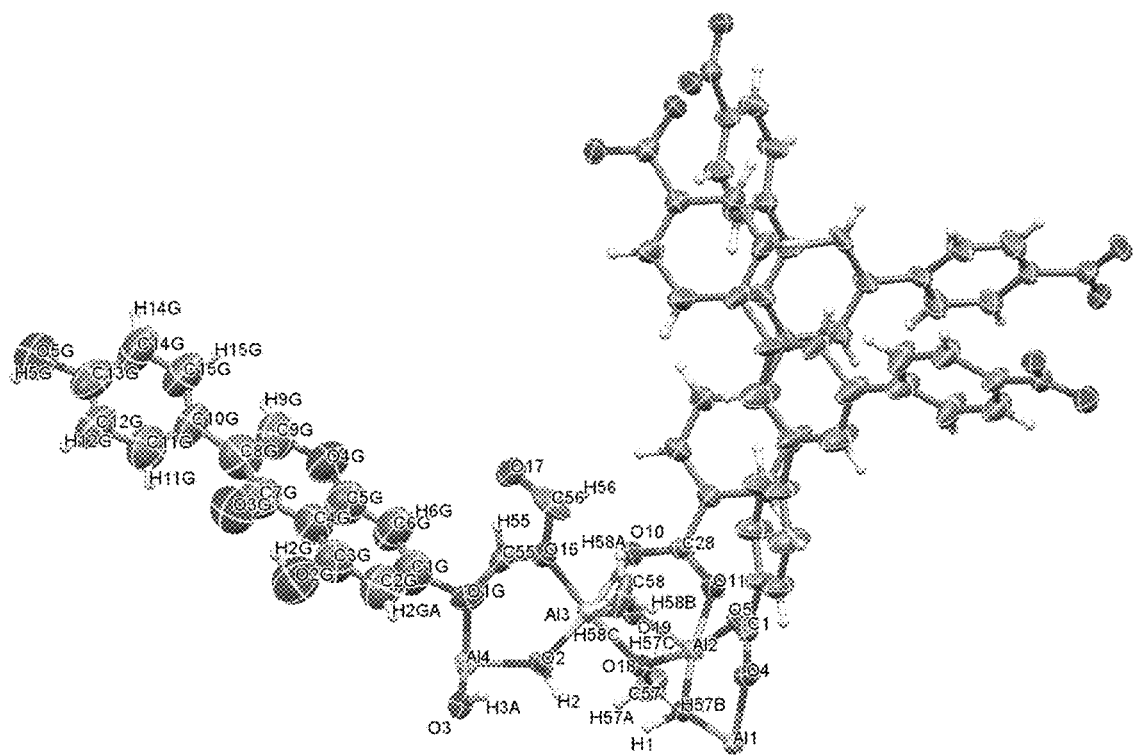
FIG. 28. Asymmetric unit in the single crystal structure of $\Delta$-MOF-520-2-11. Thermal ellipsoids are drawn with 50% probability.
Figure 29:
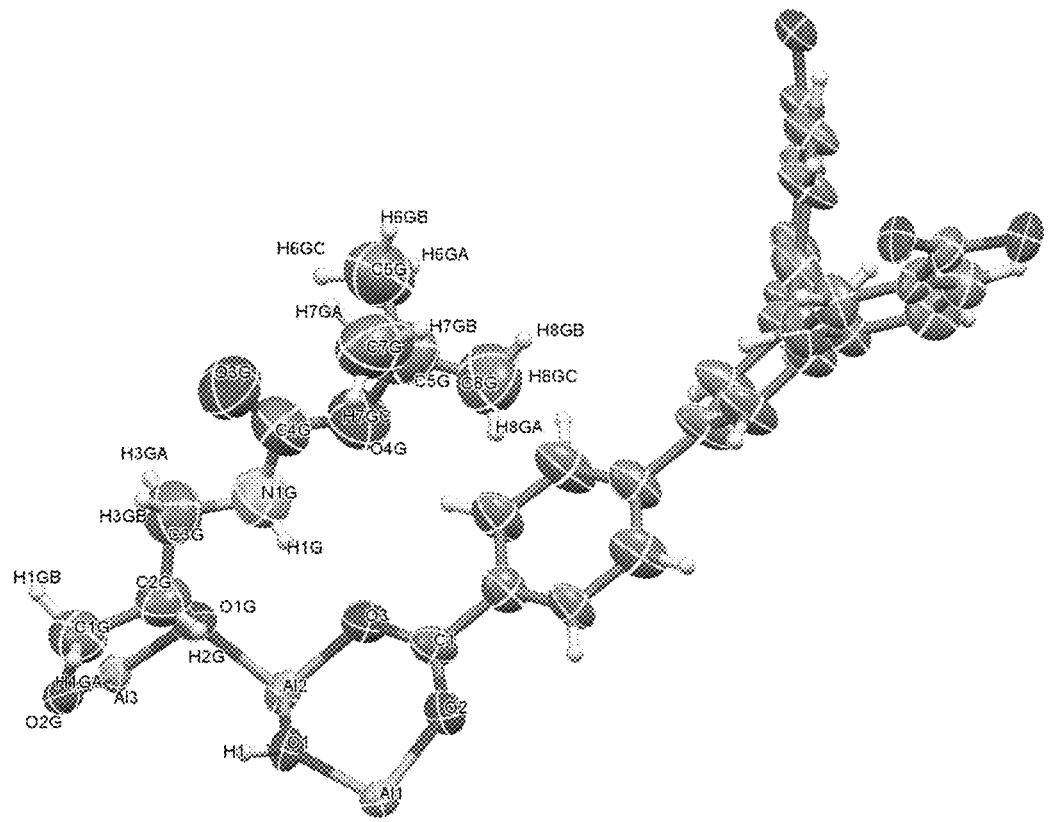
FIG. 29. Asymmetric unit in the single crystal structure of $\Lambda$-MOF-520-12. Thermal ellipsoids are drawn with 50% probability.
Figure 30:
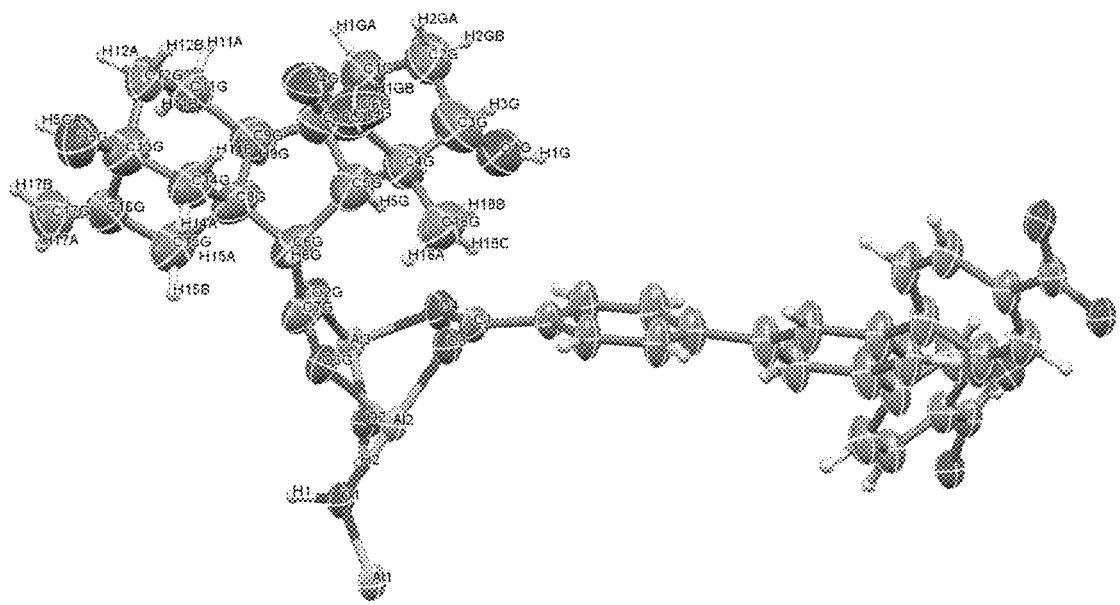
FIG. 30. Asymmetric unit in the single crystal structure of $\Lambda$-MOF-520-3-13. Thermal ellipsoids are drawn with 50% probability.
Figure 31:
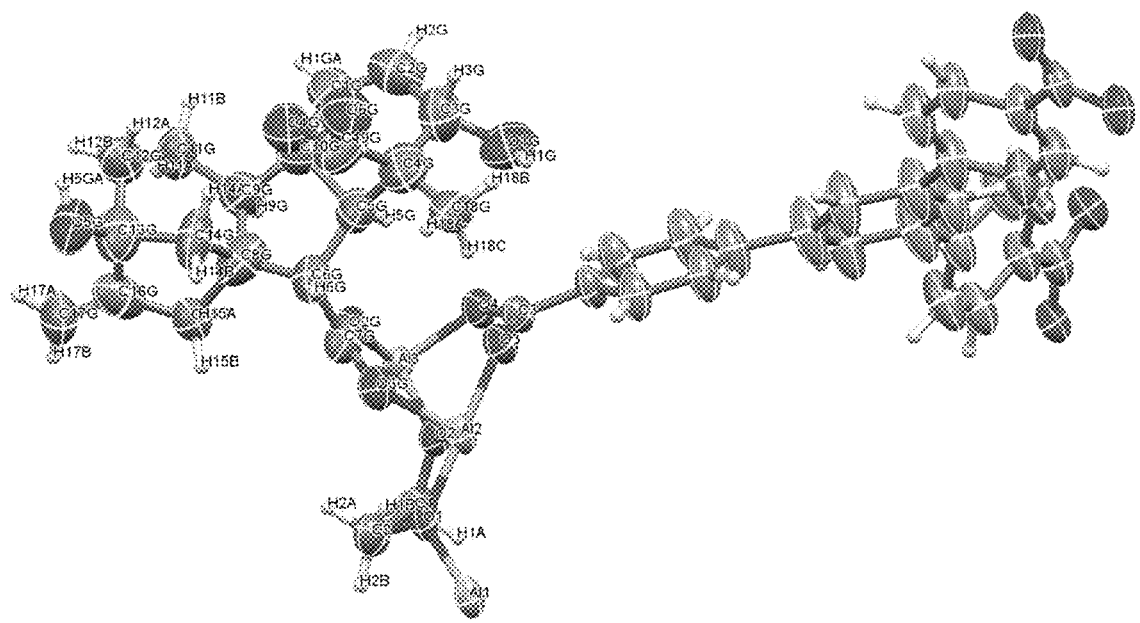
FIG. 31. Asymmetric unit in the single crystal structure of Λ-MOF-520-3-14. Thermal ellipsoids are drawn with 50% probability.
Figure 32:
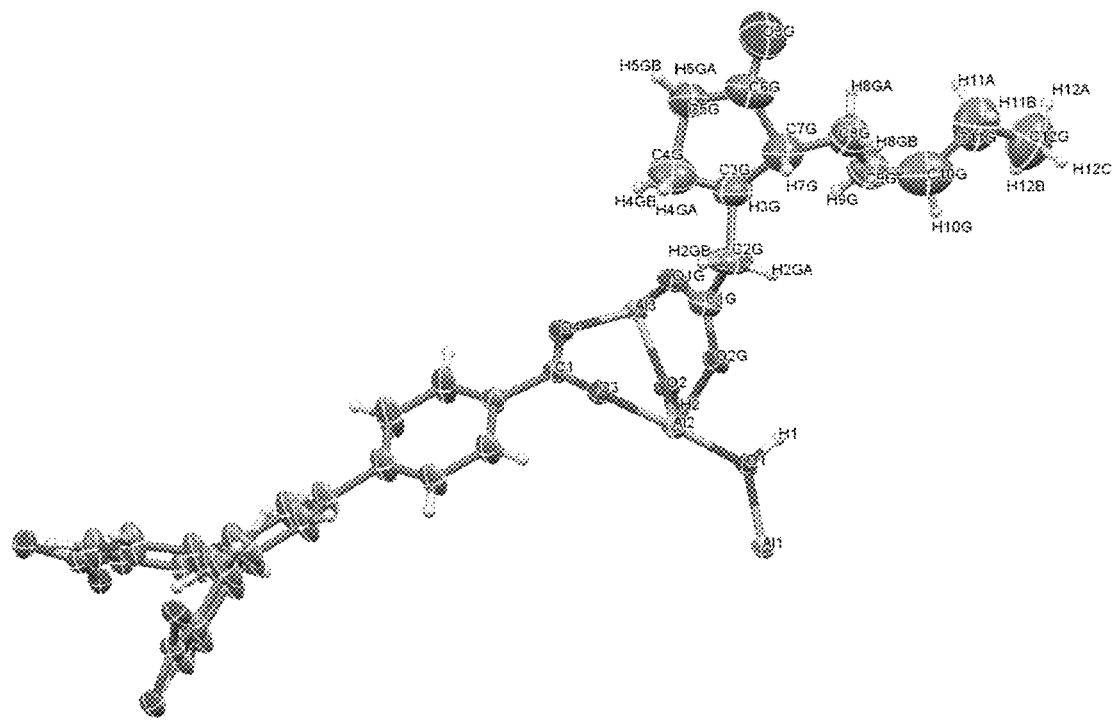
FIG. 32. Asymmetric unit in the single crystal structure of Δ-MOF-520-15. Thermal ellipsoids are drawn with 50% probability.
Figure 33:
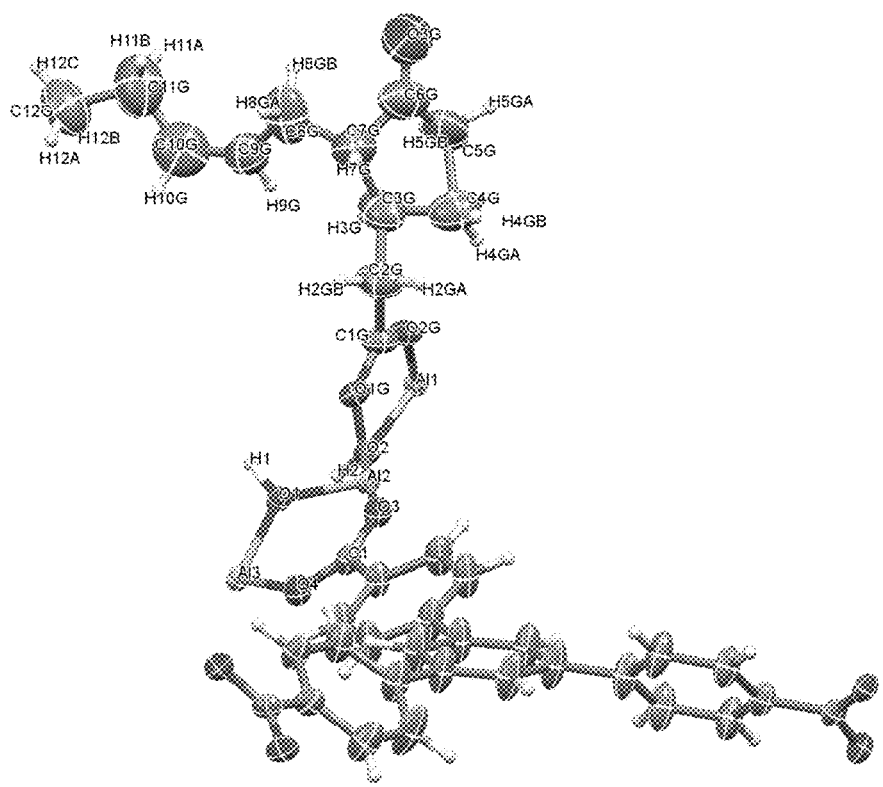
FIG. 33. Asymmetric unit in the single crystal structure of Δ-MOF-520-16. Thermal ellipsoids are drawn with 50% probability.

Unless contraindicated or noted otherwise, in these descriptions and throughout this specification, the terms "a" and "an" mean one or more, the term "or" means and/or and polynucleotide sequences are understood to encompass opposite strands as well as alternative backbones described herein.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein, including citations therein, are hereby incorporated by reference in their entirety for all purposes.

Abstract:

A chiral metal-organic framework was used to coordinatively bond and align molecules of varying size, complexity, and functionality. The reduced motional degrees of freedom obtained with this coordinative alignment (CAL) method allowed the structures of molecules to be determined by single-crystal x-ray diffraction techniques. The chirality of the MOF backbone also served as a reference in the structure solution for an unambiguous assignment of the absolute configuration of bound molecules. Sixteen molecules representing four common functional groups (primary alcohol, phenol, vicinal diol, and carboxylic acid) and ranging in complexity from methanol to plant hormones (gibberellins, containing eight stereocenters) were crystallized and had their precise structure determined. We distinguished single and double bonds in gibberellins, and enantioselectively crystallized racemic jasmonic acid, whose absolute configuration had only been inferred from derivatives.

Main Text:

Here we used our coordinative alignment (CAL) method to successfully crystallize 16 different molecules in the interior of the MOF-520-type structure (10). These molecules represent a range of functionality, flexibility, and complexity. The first 12 are relatively simple molecules but the other 4 are large and complex molecules: benzoic acid, 1, methanol, 2, ethylene glycol, 3, 3-nitrophenol, 4, heptanoic acid, 5, 3-hydroxybenzoic acid, 6, 3,5-diaminobenzoic acid, 7, trimesic acid, 8, 4-bromophenol, 9, 2-(2,6-dichloranilino)phenylacetic acid (diclofenac), 10, 5,7-dihydroxy-3-(4-hydroxyphenyl)chromen-4-one (genistein), 11, and tent-butyloxycarbonyl-(RS)-3-amino-1,2-propanediol, 12. In addition, this method led us to successfully crystallize two different type of plant hormones within the MOF: gibberellins (form $A_1$, 13, and $A_3$, 14) with eight stereocenters, and (±)-jasmonic acid (15, 16). The precision of the crystal structures with only 30% occupancy of the bound gibberellins permitted the distinction of the single bond in 13 from the double bond in 14, this being the only difference between the two complex molecules. The crystal structure of (±)-jasmonic acid, whose absolute configuration had only been inferred from derivatives, was obtained enantioselectively with each enantiomorph single crystal of the MOF binding only one enantiomer of jasmonic acid.

We chose MOF-520, $Al_8(\mu\text{-OH})_8(HCOO)_4(BTB)_4$, (BTB=1,3,5-benzenetribenzoate), as the framework for implementing the CAL method of crystallization because of its high crystallinity, robustness, and chirality (FIG. 1). Its secondary building units (SBUs) are rings of eight aluminum octahedra sharing corners through eight μ-OHs and four formate ligands. Each of these SBUs is linked by 12 BTB units, and each BTB is linked to three SBUs to make a three-dimensional, extended porous framework. Two types of ellipsoidal pores form from elongated arrangements of SBUs that octahedral (10.01 Å by 10.01 Å by 23.23 Å) and tetrahedral (5.89 Å by 5.89 Å by 6.21 Å). The framework of MOF-520 crystallizes in the noncentrosymmetric space group $P4_22_12$, with a chiral atomic arrangement. The absolute structure of each enantiomorph is designated as Λ or Δ according to the chirality of the BTB linker in the respective crystal structure (FIG. 1, A and B). Although each single crystal is nearly enantiomorphically pure, according to the Flack parameters of the refined structures, 0.049(17) for Λ and 0.031(11) for Δ (11), the overall bulk sample is a racemic conglomerate containing both enantiomorphs [table S1 to S3 (12)].

In this MOF each of the aluminum SBUs have four formate ligands in addition to 12 carboxyl units from BTB linkers to complete the octahedral coordination sites of the aluminum centers (FIG. 1). These formate ligands occupy two sites on each face of the SBU in a chiral tetrahedral arrangement with $D_2$ symmetry. We anticipated that through acid-base chemistry, we could substitute these formates with incoming organic molecules such as carboxylates, alkoxides, and phenolates (FIG. 2A). Given that the interior of the MOF has large octahedral pores, we expected molecules of varying size and complexity to diffuse into this space and covalently bind to the metal sites (FIG. 2B), and as we will show, align themselves within the MOF to be amenable to x-ray structure determination.

Prior to examining the incorporation of molecules into the pores of MOF-520, we ensured that the structure of the MOF is fully characterized using single crystal x-ray diffraction (SXRD) techniques according to our previous report (10, 12). We confirmed the chemical composition of the evacuated MOF-520 by $^1$H NMR of digested samples (calculated formate to BTB ratio: 1 to 1; found: 1 to 0.93) and by elemental analysis, (calculated, wt. %: C, 58.81; H, 3.14; N, 0.0 and found, wt. %: C, 59.20; H, 3.19; N<0.2). The porosity of MOF-520 was confirmed by measurement of $N_2$ type I isotherm at 77 K, which led to a final uptake of 770 $cm^3$ STP $g^{-1}$ at 1 atm, similar to a calculated uptake, 821 $cm^3_{STP}$ $g^{-1}$, from SXRD model. The MOF-520 samples were also characterized by infrared spectroscopy to ensure the absence of solvent in the pores, thermal gravimetric analysis to confirm the thermal stability of the MOF, and powder x-ray diffraction to confirm the bulk purity of the crystals (12).

The molecules 1 to 16 have the functionalities that include primary alcohol, phenol, vicinal diol, and carboxylic acid (FIG. 2A). These molecules were covalently bonded to the MOF by immersion of single crystals of MOF-520 in a concentrated solution of the respective molecule followed by heating (40° to 100° C.) for at least 12 hours (12). One of the single crystals in the resulting racemic conglomerate batch was chosen and SXRD data was collected. The architectural robustness and high chemical stability of MOF- 520 enabled the substitution of the symmetrically equivalent four formates in the SBU with the carboxylates of incoming molecules and their covalent binding to the SBUs with full retention of crystallinity. In addition, alkoxides and phenolates replaced only two formates on the same face of the SBU in addition to μ-OHs, as shown in FIG. 2B. This substitution pattern led to a doubling of the unit cell in the c-direction without affecting the connectivity of the MOF backbone. Consecutive SBUs along c were substituted strictly on the opposite face of the ring, leading to a change in the space groups, $P4_22_12$ of Λ and Δ-framework to an enantiomorphic pair, $P4_32_12$ (Λ) and $P4_12_12$ (Δ), respectively.

Relatively small achiral molecules were chosen to describe in detail the four different binding modes in Δ-MOF-520 for all incoming molecules: benzoic acid, 1, as an aromatic carboxylic acid, methanol, 2, as a primary alcohol, ethylene glycol, 3, as a vicinal diol, and 3-nitrophenol, 4, as a phenol. Benzoic acid shared the same binding mode as formate, where for methanol, two methoxides replaced two formates on the same face of the ring and doubly bridged the Al in a $\mu^2$ manner, thus changing the corner sharing Al octahedra to edge sharing. This geometry change induced further substitution of two μ-OHs with the alkoxide molecules. Overall, four alkoxides replaced two formates and two μ-OHs, with two coordinated formates remaining on the $C_2$ symmetric SBU. The binding mode of 3 is similar to that of 2, where the formates and μ-OHs were substituted and the same geometry change of the SBU occurred. The main difference is that the remaining two formates are now bonded to the SBU as terminal ligands, which were previously bridging ligands on the SBU of Δ-MOF-520. In the case of 4, two different binding modes were observed with positional disorder: one is similar to that of 2, and the other is shown in FIG. 2B (two of four phenolic oxygen atoms are bridging).

The resulting substituted frameworks, MOF-520-2 and -3, have a larger pore width compared to the original MOF-520 [the distance between the Al of adjacent SBUs, 14.70(4) and 14.13(5) Å, respectively, compared to the distance, 13.73(4) Å of MOF-520] (FIG. 2O). Thus, we used MOF-520 for the crystallization of incoming molecules 1 to 10, 12, 15, and 16, MOF-520-2 for 11, and MOF-520-3 for 13 and 14.

The crystal structures of all molecules bound to the MOF have been determined by SXRD and show the binding modes outlined above. All of the structures were refined anisotropically (FIG. 3). In general, the value of anisotropic displacement parameters of the incorporated molecules increased with their distance from the binding sites; as expected because the orientation of the bound molecules are mainly governed by a single site of covalent attachment. Those parts of the bound molecules that are far from the binding sites are stabilized by noncovalent interactions such as π-π interactions and weak hydrogen bonds with the aromatic rings and carboxylates of the framework (FIG. 3 and table S4).

The bound molecules 1 to 3 and 6 are simple and small in their structure; their ordering within the MOF is sustained only by covalent bonds to aluminum with no weak interactions with the framework observed (FIGS. 3, A to C, and F). The covalent binding is sufficient to anchor these molecules and lower their degrees of freedom, an aspect that is present in all crystal structures of 1 to 16; weak interactions play a role for some molecules but not all. For example, in Δ-MOF-520-6, the closest distance apart the covalent bond 6 makes to the framework is 4.46 Å, which corresponds to the distance between the ortho-carbon of 6 and the adjacent aromatic ring of the MOF, indicating that there are no contributing secondary interactions with the framework (FIG. 3F). However, the entire structure of 6 was solved without ambiguity. The OH group of 6 is pointing away from the framework, suggesting a possible repulsive interaction with the adjacent aromatic ring of the linker. No detectable residual electron density was observed in the structure refinement for the second OH group at the other mew position.

Within the MOF, molecules 10 and 11 were also ordered by anchoring through covalent bonding to aluminum, but their order was further enhanced by the presence of π-π (T-shaped for 10 and parallel-displaced for 11) and hydrogen bonding (N—H . . . O for 10 and O—H . . . π for 11) interactions to the framework (FIGS. 3, J and K). Similar interactions are also observed for the molecules 4, 5, 7 to 9, and 12 to 16. Details of the structural information including the covalent bond distances, the types of closest noncovalent interactions between the bound molecules and the framework, and refinement parameters are tabulated (table S4).

Because the CAL method yields highly ordered arrangements for molecules within the MOF, their structure can be determined even with low occupancy of the binding sites. This feature makes it possible to obtain structures of larger and more complex molecules with high accuracy and to determine the absolute configuration of chiral molecules with high certainty. The structures of gibberellins 13 and 14, two derivatives of a natural plant hormone, illustrate the power of the CAL method (FIGS. 3, M and N, and FIG. 4). All non-hydrogen atoms of these complex molecules with eight stereocenters could be assigned from an occupancy of only 30%. The structures were refined without applying any geometrical constraints and restraints on the gibberellin molecules (table S17 and S18). The accuracy of our method is documented by the characterization of the subtle structure difference between 13 and 14, where we find $C_1$-$C_2$ to be a single bond [1.57(2) Å] in 13 and a double bond [1.30(3) Å] in 14. The C—C—C bond angles at $C_1$ and $C_2$ are 105.0 (15)° and 113.3(14)° in 13 and 121.6(17)° and 117.6(18)° in 14, indicative of $sp^3$ and $sp^2$ hybridization, respectively. Ball-and-stick representations of the structures are superimposed for direct comparison in FIG. 4.

The absolute structures of Λ-MOF-520-2-13 and -14 were assigned on the basis of their Flack parameters, 0.063(9) and 0.05(2), respectively, in spite of the low occupancies of the molecules. In previous reports, the absolute configurations of the guests were determined in achiral host frameworks (7-9, 13). In those methods, pseudo-centrosymmetry problems were reported and the absolute structure determinations were obscured, even though the structures of the guests were identified in the structure solution. This problem may be caused by several factors, such as low guest occupancy (7, 9), lack of high angle reflections because of disorder of the guest (9, 14), and the nearly centrosymmetric nature of the guest (8, 9, 15). The chiral MOFs show anomalous scattering from the framework itself regardless of any included chiral molecules (15, 16). The strong enantiomorph-distinguishing power originates mainly from the scattering of the chiral framework and is enhanced by chiral and achiral bound molecules. It is sufficient for determining the absolute structure of the resulting crystal, including the absolute configuration of the bound molecule, even when the occupancy of the latter is low.

The CAL has potential to become the method of choice for the determination of the absolute configuration of molecules because it can reduce the dependence on the absolute structure parameters of the inclusion crystal data. For example, when a single crystal with absolute structure Λ has been determined by SXRD and subsequently used in the inclusion, the absolute configuration of the incorporated molecule can be directly deduced from the pre-determined Λ structure. In this case, the correctness of the absolute configuration of incorporated molecules is highly dependent on the pre-determined absolute structure and the knowledge of the enantiopurity of the single crystal used for the inclusion (6).

Finally, we demonstrate that the chirality of the binding sites of MOF-520 can separate enantiomers when one interacts more favorably with the binding site of one of the enantiomorphs of the MOF. We determined the absolute configuration of another plant hormone, jasmonic acid, for which a crystal structure has heretofore not been reported. A solution of a racemic mixture of (−)-jasmonic acid, 15, and (+)-jasmonic acid, 16, was reacted with a racemic conglomerate of MOF-520, and SXRD data for two enantiomorphic crystals was collected after the reaction. The molecule 15 selectively attached to Δ-MOF-520 and 16 to Λ-MOF-520 (FIG. 3, O and P). The positions of the last three carbons were not clearly defined, presumably because of their conformational flexibility, the low occupancy of 33%, and the ensuing overlap with the electron density of residual disordered solvent. However, the atoms defining the stereocenters of 15 and their absolute configurations, R for $C_3$ and R for $C_7$, were observed unambiguously with a Flack parameter of 0.037(8). This result corresponds to that deduced from the absolute configurations of a derivative of 15, (−)-methyl jasmonate, which were determined by a synthetic approach (17). The enantiomer 16 attached to Λ-MOF-520 showed the opposite absolute configuration as indicated by a refined Flack parameter of 0.040(8). We note that the enantiomerically pure molecules, 13 and 14, had an occupancy that was sufficiently high for unambiguous structure and absolute configuration determination only in one of the two enantiomorphs. This can be applied to the absolute configuration determination of samples, which contain a minor enantiomer, without the need of chiral HPLC separation before carrying out the inclusion procedure (7).

Section S1.1. Synthesis of MOF-520 Single Crystals
MOF-520, $Al_8(OH)_8(HCOO)_4BTB_4$.

In a 20 mL scintillation vial, the mixture solution of $Al(NO_3)_3 \cdot 9H_2O$ (90.0 mg, 0.240 mmol), $H_3BTB$ (75.0 mg, 0.170 mmol) in DMF (17 mL) was prepared. The solution was sonicated for 1 min and formic acid (1.40 mL, 0.0310 mol) was added to the solution. The vial was capped and placed in the preheated 140° C. oven. After 4 days, block shaped clear single crystals with size range 50 to 100 μm were obtained on the wall of the vial. Subtle temperature difference can affect the quality of the single crystals. It is recommended that several vials containing the solution be set together and placed in different locations in the oven. The vial with the best single crystals was chosen and the single crystals were used for the inclusion of the molecules. For the characterization of MOF-520, the rest of the crystals were further processed.

Solvent Exchange and Guest Removal Activation Procedure:

The single crystals were washed with DMF (10.0 mL) three times per day for three days to remove the unreacted reagents in the pores. DMF solvent in the pore was exchanged with anhydrous acetone by washing the crystals with anhydrous acetone (10.0 mL) three times per day for three days. For supercritical $CO_2$ drying (SCD) activation, the acetone was decanted and acetone in the crystals was thoroughly exchanged with liquid $CO_2$ in the chamber of a Tousimis Samdri PVT-3D critical point dryer. The sample was subsequently kept in a supercritical $CO_2$ atmosphere (typical conditions of 40° C. and 1200 psi) for 30 min and then the supercritical $CO_2$ was slowly vented over the course of 6 hours. To remove the residual molecules in the pores, the crystals were evacuated for 6 h at 120° C. under 30 mTorr. Yield: 16% based on Al. ATR-FTIR ($cm^{-1}$): 3059 (w), 1613 (s), 1600 (s), 1565 (m), 1517 (w), 1456 (s), 1423 (s), 1293 (w), 1183 (m), 1153 (w), 1105 (w), 1018 (w), 977 (m), 858 (w), 819 (w), 787 (s), 712 (m), 678 (m), 640 (s), 589 (s), 548 (s), 498 (m), 446 (w). EA: Found (wt %): C: 59.20; H: 3.19; N: <0.2. Calculated (wt %): C: 58.81; H: 3.14; N: 0.0.

Section S1.2. Single Crystal X-Ray Diffraction Analysis of MOF-520

Single-crystalline samples were mounted on MiTeGen® kapton loops in LV CryoOil® and placed in a 100(2) K nitrogen cold stream from Oxford Cryosystems Cryostream equipment. In all cases, the raw data were processed with the Bruker APEX2 software package. The data were first integrated using the SAINT procedure and then corrected for absorption with SADABS procedure. The structures were solved by direct methods (XS-2008) and the refinement was done by full-matrix least squares on $F^2$ (SHELXL-2014), using the Olex2 software package (18, 19). Mercury software was used for structure visualization (20).

Λ-MOF-520.

A truncated octahedron-shaped crystal (80×60×60 μm³) of as-synthesized Λ-MOF-520 was measured at beamline 11.3.1 at the ALS with radiation of λ=1.0333 Å. According to intensity statistics table for the whole dataset (PRP file), the resolution was cut off to 0.83 Å. Solvent masking was applied during structure refinement. Before solvent masking instruction, structure was refined anisotropically and hydrogen atoms were placed into positions calculated geometrically. The connected asymmetric unit was defined inside the unit cell: MOVE command was applied to all atoms. The weighting scheme is refined as well as the extinction coefficient. The void volume is estimated to be 8963 Å³ with 9196 electrons removed during masking. Some reflections were omitted due to non-ideal solvent masking, beam stop clipping and the minor presence of diffuse scattering. The threshold $(I_{obs}-I_{calc})/\sigma(W)>10$ was chosen for omitting these reflections. Omission of these reflections did not affect the refinement; the fraction of omitted reflections is less than 0.1% of the whole dataset.

TABLE S1

Crystal data, data collection, and structure refinement parameters for Λ-MOF-520.

| | |
|---|---|
| Name | Λ-MOF-520 |
| Chemical composition of MOF per asymmetric unit | $Al_2 C_{28} H_{18} O_{10}$ |
| Chemical formula of bound molecule | none |
| Bound molecule occupancy | 0% |
| Formula mass | 568.38 |
| Crystal system | Tetragonal |
| Space group | $P4_22_12$ |
| a, Å | 18.5370(6) |
| c, Å | 37.4217(15) |
| V, Å³ | 12858.9(10) |
| d, g cm⁻³ | 0.587 |
| μ, mm⁻¹ | 0.210 |
| Z | 8 |
| Measured reflections | 75723 |
| Independent reflections | 11665 |
| Observed reflections | 10335 |

TABLE S1-continued

Crystal data, data collection, and structure refinement parameters for Λ-MOF-520.

| | |
|---|---|
| $\theta_{min}$, ° | 2.248 |
| $\theta_{max}$, ° | 38.523 |
| h | −22 to 18 |
| k | −22 to 22 |
| l | −33 to 43 |
| R int | 0.0550 |
| R [$F^2 > 2\sigma(F^2)$] | 0.0290 |
| wR($F^2$) | 0.0800 |
| S | 0.991 |
| Parameters | 373 |
| Geometrical restraints on the molecule | 0 |
| Occupational constraints on the molecule | 0 |
| Geometrical constraints on the molecule | 0 |
| Flack parameter | 0.049(17) |
| $\Delta\rho_{max}$, e Å$^{-3}$ | 0.144 |
| $\Delta\rho_{min}$, e Å$^{-3}$ | −0.114 |
| Crystal size, mm$^3$ | 0.080 × 0.060 × 0.060 |
| Radiation, Å | 1.0333 |
| Temperature, K | 100 |
| CCDC number | 1488951 |

Δ-MOF-520.

A colorless truncated octahedron-shaped crystal (80×60×60 μm$^3$) of as-synthesized Δ-MOF-520 was measured at Bruker MicroSTAR-H APEX II diffractometer with radiation of λ=1.54178 Å. According to intensity statistics table for the whole dataset (PRP file), the resolution was cut off to 0.83 Å. Solvent masking was applied during structure refinement. Before solvent masking instruction, structure was refined anisotropically and hydrogen atoms were placed into positions calculated geometrically. The connected asymmetric unit was defined inside the unit cell: MOVE command was applied to all atoms. The weighting scheme is refined as well as the extinction coefficient. The void volume is estimated to be 8913 Å$^3$ with 8417 electrons removed during masking. Some reflections were omitted due to non-ideal solvent masking, beam stop clipping and the minor presence of diffuse scattering. The threshold $(I_{obs}-I_{calc})/\sigma(W)>10$ was chosen for omitting these reflections. Omission of these reflections did not affect the refinement; the fraction of omitted reflections is less than 0.1% of the whole dataset.

TABLE S2

Crystal data, data collection, and structure refinement parameters for Δ-MOF-520.

| | |
|---|---|
| Name | Δ-MOF-520 |
| Chemical composition of MOF per asymmetric unit | Al$_2$ C$_{28}$ H$_{18}$ O$_{10}$ |
| Chemical formula of bound molecule | none |
| Bound molecule occupancy | 0% |
| Formula mass | 568.38 |
| Crystal system | Tetragonal |
| Space group | P4$_2$2$_1$2 |
| a, Å | 18.4753(4) |
| c, Å | 37.4264(9) |
| V, Å$^3$ | 12775.0(6) |
| d, g cm$^{-3}$ | 0.662 |
| μ, mm$^{-1}$ | 0.324 |
| Z | 8 |
| Measured reflections | 49798 |
| Independent reflections | 11725 |
| Observed reflections | 10446 |
| $\theta_{min}$, ° | 2.667 |
| $\theta_{max}$, ° | 68.374 |
| h | −22 to 20 |
| k | −21 to 15 |
| l | −45 to 44 |
| R int | 0.0335 |
| R [$F^2 > 2\sigma(F^2)$] | 0.0339 |
| wR($F^2$) | 0.0897 |
| S | 0.989 |
| Parameters | 373 |
| Geometrical restraints on the molecule | 0 |
| Occupational constraints on the molecule | 0 |
| Geometrical constraints on the molecule | 0 |
| Flack parameter | 0.031(11) |
| $\Delta\rho_{max}$, e Å$^{-3}$ | 0.403 |
| $\Delta\rho_{min}$, e Å$^{-3}$ | −0.165 |
| Crystal size, mm$^3$ | 0.080 × 0.070 × 0.070 |
| Radiation, Å | 1.54178 |
| Temperature, K | 100 |
| CCDC number | 1488944 |

TABLE S3

The structure refinement parameters for MOF-520 obtained from a statistical experiment to estimate the racemic character of 21 MOF-520 single crystals (13 Δ and 8 Λ forms).

| Form | R int | R [I > 2σ(I)] | A | Flack parameter, x(u) |
|---|---|---|---|---|
| Δ (delta) | 0.0415 | 0.0310 | 1.092 | 0.106(9) |
| Δ (delta) | 0.0716 | 0.0411 | 0.950 | −0.01(8) |
| Δ (delta) | 0.0566 | 0.0333 | 0.890 | 0.01(2) |
| Δ (delta) | 0.0820 | 0.0414 | 0.963 | −0.01(7) |
| Δ (delta) | 0.0490 | 0.0289 | 1.027 | 0.073(19) |
| Δ (delta) | 0.0414 | 0.0286 | 1.053 | 0.077(11) |
| Δ (delta) | 0.0409 | 0.0390 | 0.938 | 0.05(3) |
| Δ (delta) | 0.0299 | 0.0378 | 0.928 | 0.08(4) |
| Δ (delta) | 0.0307 | 0.0418 | 0.956 | 0.11(4) |
| Δ (delta) | 0.0204 | 0.0343 | 1.119 | 0.15(4) |
| Δ (delta) | 0.0391 | 0.0404 | 0.920 | 0.05(6) |
| Δ (delta) | 0.0595 | 0.0498 | 1.055 | 0.08(6) |
| Δ (delta) | 0.0430 | 0.0348 | 1.010 | 0.10(1) |
| Λ (lambda) | 0.0356 | 0.0305 | 1.054 | 0.040(13) |
| Λ (lambda) | 0.0479 | 0.0325 | 1.072 | 0.03(4) |
| Λ (lambda) | 0.0650 | 0.0281 | 1.074 | 0.11(3) |
| Λ (lambda) | 0.0892 | 0.0432 | 1.056 | 0.06(2) |
| Λ (lambda) | 0.0661 | 0.0331 | 1.035 | 0.13(3) |
| Λ (lambda) | 0.0596 | 0.0336 | 0.969 | 0.06(3) |
| Λ (lambda) | 0.0497 | 0.0461 | 0.910 | −0.12(5) |
| Λ (lambda) | 0.0382 | 0.0289 | 1.103 | 0.07(1) |

Section S1.3. Powder X-Ray Diffraction Analysis

Guest free single crystals were used for PXRD experiment. Ground sample was placed on a quartz sample holder and was mounted on the diffractometer. The data was collected from 2 to 50 degrees by 0.02 step for total 60 minutes data collection time.

Section S1.4. N$_2$ Isotherm 40 mg of guest free samples in 9 mm bulb gas cell was charged with Ar to avoid air contamination and the cell was mounted on the instrument. Liquid nitrogen bath was used for the measurements at 77 K. Helium was used for the estimation of dead space for gas adsorption measurements. Ultra-high-purity grade N$_2$ and He gases (Praxair, 99.999% purity) were used throughout the adsorption experiments. 46 adsorption and 16 desorption points were collected.

Section S1.5. Thermogravimetric Analysis

The guest free sample was held in a platinum pan under nitrogen atmosphere with a flow rate of 40 mL/min. Temperature was controlled by the furnace heating from 25° C. up to 800° C. with a ramp rate of 5° C./min Section S1.6. ¹H NMR The guest free sample (1 mg) was transferred to a 4 mL vial. Deuterated dimethyl sulfoxide ($d_6$-DMSO) (600 μL) was add to the vial followed by the addition of 20 μL of NaOH (1 M in $D_2O$). The solution was sonicated for 10 min to digest the crystals. The vial was capped and placed in a preheated 120° C. oven for 20 min to completely dissolve the crystals. The final clear solution was used for the ¹H NMR experiment.

Section S2. Inclusion Procedures and Single Crystal X-Ray Diffraction Analyses

Section S2.1. Inclusion Procedures

Diclofenac sodium salt, benzoic acid, heptanoic acid, anhydrous ethylene glycol (99.8%), and anhydrous methanol (99.8%) were purchased form Sigma Aldrich Co. 3-hydroxybenzoic acid, gibberellin $A_3$, genistein, (±)-jasmonic acid, 4-bromophenol, 1,3,5-benzentricarboxylic acid, 3-nitrophenol, and 3,5-diaminobenzoic acid were purchased from TCI America. Boc-(RS)-3-amino-1,2-propanediol was purchased from AnaSec Inc. Gibberellin $A_1$ was purchased from Santa Cruze Biotechnology, Inc. All chemicals obtained were used without further purification.

MOF-520 Single Crystal Preparation.

As-synthesized MOF-520 single crystals were washed with fresh DMF (10 mL), three times per day for three days to remove unreacted starting materials in the pore. Between each washing procedure, the crystals were kept in fresh DMF (18 mL in a 20 mL vial). Otherwise mentioned in the detail procedure, MOF-520 single crystals impregnated with DMF were used for the molecule showing better solubility in DMF. When the molecules dissolve better in acetone, MOF-520 single crystals impregnated with acetone were prepared by exchanging DMF in the pore with fresh acetone following the solvent exchange procedure in Section S1.1. Since the bulk sample is a racemic conglomerate, a mixture of both enantiomers was used for the inclusion.

General Inclusion Procedure.

In general, the introduction of the molecules (15 to 50 mg scale) into MOF-520 was carried out by soaking MOF-520 single crystals impregnated with fresh DMF or acetone in a saturated solution of the molecule in DMF or acetone, respectively. The choice of the solvent of the solution was decided by the solubility of the molecules. The mixture of MOF-520 and the molecule solution was prepared in a scintillation vial. The vial was closed with a polypropylene cap having foil liner and placed in a preheated isothermal oven, 40° C. for acetone solution and 100° C. for DMF solution. After several days, SXRD data collection was carried out with the resulting single crystals. To confirm the incorporation of molecules along with SXRD data, ¹H NMR data was collected for MOF-520-1 to -5 following the procedure in Section S1.6. They represent the whole functionalities though which the molecules, 1 to 16, bind to Al. Although the incorporation can be confirmed from the NMR data, some of the integration ratio, molecule to $H_3BTB$ linker, show deviation from the occupancy in the refined structures (Section S2.2). This can be explained by that the molecule incorporation in a single crystal does not represent the whole batch of the sample.

MOF-520-1 (1=Benzoic Acid).

Benzoic acid solution was prepared by adding benzoic acid (40.0 mg, 0.326 mmol) to DMF (200.0 μL) in a 4 mL vial and the solution was sonicated for 10 min to dissolve the material. MOF-520 single crystals (1.0 mg) impregnated with DMF were added to the solution. The vial was closed and placed in the preheated 100° C. oven. After 12 hours, the vial was kept at room temperature to slowly cool down the solution. SXRD data was collected with a single crystal from the vial.

MOF-520-2 (2=Methanol).

The activated guest free single crystals of MOF-520 (50 mg) were soaked in anhydrous methanol (10 mL) in a 20 mL vial. The vial was kept in a preheated 40° C. oven for 15 days. After the reaction, the vial was cooled down at room temperature. One of the single crystals was used for SXRD analysis and rest of the crystals were activated to evacuate the pore. The same solvent exchange and activation procedure for MOF-520 was applied (Section S1.1).

MOF-520-3 (3=ethylene glycol). The activated single crystals of MOF-520 (50 mg) were soaked in ethylene glycol (10 mL) in a 20 mL vial. The vial was kept in a preheated 100° C. oven for 5 days. After the reaction, one of the single crystals was used for SXRD analysis and rest of the crystals were activated to evacuate the pore. The same solvent exchange and activation procedure for MOF-520 was applied (Section S1.1).

MOF-520-4 (4=3-Nitrophenol).

3-nitrophenol solution was prepared by adding 3-nitrophenol (60.0 mg, 0.432 mmol) to anhydrous acetone (200.0 μL) in a 4 mL vial followed by adding triethylamine (2.0 μL) into the solution. MOF-520 single crystals (1.0 mg) impregnated with acetone were added to the solution. The vial was capped and placed in the room temperature for 10 days. SXRD data was collected with a single crystal from the vial.

MOF-520-5 (5=heptanoic acid).

Heptanoic acid solution was prepared by adding heptanoic acid (60.0 μL, 0.424 mmol) to anhydrous DMF (200.0 μL) in a 4 mL vial. MOF-520 single crystals (1.0 mg) impregnated with DMF were added to the solution. The vial was closed and placed in the preheated 100° C. oven. After 2 days, SXRD data was collected with a single crystal from the vial.

MOF-520-6 (6=3-Hydroxybenzoic Acid).

3-hydroxybenzoic acid (60.0 mg, 0.434 mmol) was added to DMF (200.0 μL) in a 4 mL vial and the solution was sonicated for 10 min to dissolve the material. MOF-520 single crystals (1.0 mg) impregnated with DMF were added to the solution. The vial was capped and placed in preheated 100° C. oven for 24 hrs. SXRD data was collected with a single crystal from the vial.

MOF-520-7 (7=3,5-Diaminobenzoic Acid).

3-hydroxybenzoic acid (60.0 mg, 0.394 mmol) was added to anhydrous acetone (200.0 μL) in a 4 mL vial and the solution was sonicated for 10 min to dissolve the material. MOF-520 single crystals (1.0 mg) impregnated with acetone were added to the solution. The vial was capped and placed in preheated 40° C. oven for 2 days. SXRD data was collected with a single crystal from the vial.

MOF-520-8 (8=Trimesic Acid).

Trimesic acid (50.0 mg, 0.238 mmol) was added to DMF (200.0 μL) in a 4 mL vial and the solution was sonicated for 10 min to dissolve the material. MOF-520 single crystals (1.0 mg) impregnated with DMF were added to the solution. The vial was capped and placed in preheated 100° C. oven for 24 hrs. SXRD data was collected with a single crystal from the vial.

MOF-520-9 (9=4-Bromophenol).

4-bromophenol solution was prepared by adding 4-bromophenol (60.0 mg, 0.432 mmol) to anhydrous acetone (200.0 μL) in a 4 mL vial followed by adding triethylamine (2.0 μL) into the solution and the solution was sonicated for 10 min to dissolve the material. MOF-520 single crystals (1.0 mg) impregnated with acetone were added to the solution and the vial was placed in the preheated 40° C. oven for 10 days. SXRD data was collected with a single crystal from the vial.

MOF-520-10 (10=Diclofenac).

Diclofenac solution was prepared by adding sodium diclofenac sodium salt (30.0 mg, 0.094 mmol) to anhydrous DMF (150.0 μL) in a Pyrex tube measuring 10×8 mm (o.d×i.d) and the solution was sonicated for 10 min to dissolve the material. MOF-520 single crystals (2.0 mg) impregnated with DMF were added to the solution. The tube was sealed by freeze-pump-thaw method (30 mTorr) and placed in the preheated 100° C. oven for 3 days. SXRD data was collected with a single crystal from the tube.

MOF-520-2-11 (11=Genistein).

Genistein solution was prepared by adding genistein (10.0 mg, 0.0370 mmol) to anhydrous acetone (400.0 μL) in a 4 mL vial followed by adding triethylamine (10 μL), and the solution was sonicated for 10 min to dissolve the material. MOF-520-2 single crystals (3.0 mg) impregnated with acetone were added to the solution. The vial was capped and placed in the preheated 45° C. oven for 5 days. SXRD data was collected with a single crystal from the vial.

MOF-520-12 (12=Boc-(RS)-3-Amino-1,2-Propanediol).

Boc-(RS)-3-amino-1,2-propanediol solution was prepared by adding Boc-(RS)-3-amino-1,2-propanediol (50.0 mg, 0.094 mmol) to DMF (300.0 μL) and the solution was sonicated for 10 min to dissolve the material. MOF-520 single crystals (1.0 mg) impregnated with DMF were added to the solution. The vial was capped and placed in preheated 100° C. oven for 3 days. SXRD data was collected with a single crystal from the vial.

MOF-520-3-13 (13=Gibberellin $A_1$).

Gibberellin $A_1$ solutions was prepared by adding gibberellin $A_1$ (15.0 mg, 0.0433 mmol) to DMF (200.0 μL) in a 4 mL vial, and the solution was sonicated for 10 min to dissolve the material. MOF-520-3 single crystals (5.0 mg) impregnated with DMF were added to the solution. The vial was capped and placed in the preheated 100° C. oven for 5 days. SXRD data was collected with a single crystal from the vial.

MOF-520-3-14 (14=Gibberellin $A_3$).

Gibberellin $A_3$ solutions was prepared by adding gibberellin $A_3$ (15.0 mg, 0.0433 mmol) to DMF (200.0 μL) in 10 mm opening Pyrex tube, and the solution was sonicated for 10 min to dissolve the material. MOF-520-3 single crystals (5.0 mg) impregnated with DMF were added to the solution. The tube was sealed by freeze-pump-thaw method (50 mTorr) and placed in the preheated 100° C. oven for 4 days. SXRD data was collected with a single crystal from the tube.

MOF-520-15 and -16 (15=(−)-Jasmonic Acid, 16=(+)-Jasmonic Acid).

(±)-Jasmonic acid solution was prepared by adding (±)-jasmoic acid (100 μL) to anhydrous DMF (100.0 μL) in the Pyrex tube, and the solution was sonicated for 1 min to dissolve the material. MOF-520 single crystals (2.0 mg) impregnated with DMF were added to the solution. The tube was sealed by freeze-pump-thaw method (30 mTorr) and placed in the preheated 100° C. oven for 4 days. SXRD data was collected with a single crystal from the tube.

Section S2.2. Single Crystal X-Ray Analysis of Inclusion Crystals

After the inclusion of the molecules, several single crystals from each batch were mounted on the diffractometer and SXRD data was collected. In a typical experiment the single-crystalline sample was mounted on MiTeGen® kapton loops in LV CryoOil® and placed in a 100(2) K nitrogen cold stream from Oxford Cryosystems Cryostream equipment. All the resulting batches after the inclusion are also racemic conglomerate as pristine MOF-520. The best data in terms of the occupancy of the molecules incorporated was chosen and reported here. Since the chirality of a single crystal could not be distinguished by inspection of the shape of the crystal or by polarized light, the choice of the chirality of the inclusion crystal from the batch was not in control. The resolution obtained for all samples was limited due to inherent disorder in the crystals; in order to improve the refinement of the model, the resolution was cut off, according to intensity statistics table. In case of measurements with synchrotron radiation, i.e. the wavelength is not $CuK_\alpha$, the DISP command was used to set the f', f'', and μ values for atoms in the structures.

The refinement procedure can be divided into several parts: the anisotropic refinement of the MOF structure, the localization and assignment of the bound molecule, the anisotropic refinement of the bound molecule, and solvent masking procedure. First, the structure of MOF is refined anisotropically and all hydrogen atoms are placed into geometrically calculated positions. The connected asymmetric unit was defined inside the unit cell: MOVE command was applied to all atoms. The weighting scheme is refined as well as the extinction coefficient. After this step, we started to assign the electron density peaks, which are closest to the binding site, and can be interpreted as a part of the bound molecule. The assigned atoms are refined with $U^{iso}$=0.05. Once assignment of large part of the molecule is done, the occupancy of the bound molecule is estimated with a free variable and isotropic displacement parameters were refined freely. Once the refinement has run to convergence, the resulting occupancy is fixed throughout the whole bound molecule. Typically, standard deviations of $U^{iso}$'s tend to increase with increasing distance from the binding site. The occupancy of binding carboxylate group or alcoholic or phenolic oxygen atoms are given unit value. Once the whole molecule is localized and fixed, a step-by-step anisotropic refinement is carried out: the closest atom to the binding site is refined first followed by the refinement of further atom. Once all non-hydrogen atoms are refined anisotropically, hydrogen atoms present at the target molecule are placed into geometrically calculated positions. The electron density due to the presence the highly disordered solvent molecule of DMF within the pore, is accounted for by a solvent masking procedure (21). Note that due to partial occupancy of the target molecule at the binding site of the SBU, the electron density of the target molecule is superimposed by some solvent density, which cannot be taken into account by the solvent masking procedure. In addition, it needs to be considered that obscuring of low-angle reflections significantly affects the amount of unassigned electron density, accounted by solvent masking procedure, but not the geometry of bound molecule. Before and after solvent masking, the Flack parameters are within the 3σ error range, i.e. $|x_{before\ masking} - x_{after\ masking}| < 3[(u_{before\ masking})^2 + (u_{after\ masking})^2]^{1/2}$, where x is the absolute Flack parameter value and u is its estimated standard deviation (22).

All geometrical restraints and occupational constraints, applied to non-hydrogen atoms of bound molecules, are listed in the CIF files as well as on the corresponding table of each structure.

TABLE S4

The distances of covalent bonding and types of intramolecular interactions in all structures with their crystallographic refinement parameters.

| Structure | MOF-bound molecule Al—O distance [a] /Å | Types of non-covalent interactions [b] | R [I > 2σ(I)] | S | Flack parameter, x(u) |
|---|---|---|---|---|---|
| Δ-MOF-520-1 | 1.913(4) 1.994(4) | N/A | 0.0508 | 0.965 | 0.076(15) |
| Λ-MOF-520-2 | 1.8648(12) 1.9008(12) | N/A | 0.0334 | 0.982 | 0.059(14) |
| Δ-MOF-520-3 | 1.882(3) 1.941(3) | N/A | 0.0385 | 0.916 | 0.10(3) |
| Λ-MOF-520-4 | 1.876(3) 1.944(3) | π-π (P) [c] | 0.0560 | 1.051 | 0.07(4) |
| Δ-MOF-520-5 | 1.9084(16) 1.9268(16) | CH-π | 0.0372 | 1.024 | 0.064(8) |
| Δ-MOF-520-6 | 1.904(3) 1.918(3) | N/A | 0.0542 | 1.025 | 0.07(3) |
| Δ-MOF-520-7 | 1.8978(18) 1.8986(19) | NH-π | 0.0418 | 1.002 | 0.06(4) |
| Δ-MOF-520-8 | 1.900(7) 1.966(8) | OH-π | 0.0620 | 0.988 | 0.10(3) |
| Λ-MOF-520-9 | 1.889(3) 1.911(3) | π-π (P), π-π (T) [d] | 0.0613 | 1.018 | 0.10(3) |
| Δ-MOF-520-10 | 1.907(6) 1.921(6) | π-π (T), NH—O | 0.0532 | 1.050 | 0.13(2) |
| Δ-MOF-520-2-11 | 1.878(3) | π-π (P), π-π (T), OH-π | 0.0516 | 1.081 | 0.144(16) |
| Λ-MOF-520-12 | 1.873(3) 1.922(3) | CH-π, NH—O | 0.0523 | 1.024 | 0.040(15) |
| Λ-MOF-520-3-13 | 1.9106(18) 1.9238(17) | CH-π, OH-π | 0.0568 | 1.082 | 0.063(9) |
| Λ-MOF-520-3-14 | 1.909(3) 1.918(3) | CH-π, OH-π | 0.0580 | 0.942 | 0.05(2) |
| Δ-MOF-520-15 | 1.9025(18) 1.9299(17) | CH-π, CH—O | 0.0474 | 1.040 | 0.037(8) |
| Λ-MOF-520-16 | 1.9099(16) 1.9255(15) | CH-π, CH—O | 0.0460 | 1.082 | 0.040(8) |

Superscript
[a] more than one covalent interactions are indicated by the range of the distances,
[b] the types of interactions are estimated considering the functional groups and the distance between them,
[c] parallel-displaced,
[d] T-shaped configuration.

Δ-MOF-520-1.

A colorless truncated octahedron-shaped crystal (110×80×80 μm$^3$) of Δ-MOF-520-1 was measured at a Bruker D-8-Venture diffractometer with radiation of λ=1.54178 Å. According to intensity statistics table for the whole dataset (PRP file), the resolution was cut off to 1.00 Å. Solvent masking was applied during structure refinement. Before solvent masking instruction, structure was refined anisotropically and hydrogen atoms were placed into positions calculated geometrically. The molecule of benzoic acid was found to be positionally disordered (two parts with 0.5 occupancy). Solvent masking was applied during structure refinement. Before solvent masking instruction, structure was refined anisotropically and hydrogen atoms were placed into positions calculated geometrically. The connected asymmetric unit was defined inside the unit cell: MOVE command was applied to all atoms. The weighting scheme is refined as well as the extinction coefficient. The void volume is estimated to be 8312 Å$^3$ with 5692 electrons. Some reflections were omitted due to non-ideal solvent masking, beam stop clipping and the minor presence of diffuse scattering. The threshold $(I_{obs}-I_{calc})/\sigma(W)>10$ was chosen for omitting these reflections. Omission of these reflections did not affect the refinement; the fraction of omitted reflections is less than 0.1% of the whole dataset.

TABLE S5

Crystal data, data collection, and structure refinement parameters for Δ-MOF-520-1.

| Name | Δ-MOF-520-1 |
|---|---|
| Chemical composition of MOF per asymmetric unit | Al$_2$ C$_{27}$ H$_{17}$ O$_8$ |
| Chemical formula of bound molecule | C$_7$ H$_5$ O$_2$ |
| Bound molecule occupancy | 100% |
| Formula mass | 644.47 |
| Crystal system | Tetragonal |
| Space group | P4$_2$2$_1$2 |
| a, Å | 18.9406(5) |
| c, Å | 36.6364(11) |
| V, Å$^3$ | 13143.2(8) |
| d, g cm$^{-3}$ | 0.651 |
| μ, mm$^{-1}$ | 0.642 |
| Z | 8 |
| Measured reflections | 40325 |
| Independent reflections | 6901 |
| Observed reflections | 5022 |
| θ$_{min}$, ° | 2.412 |
| θ$_{max}$, ° | 50.498 |
| h | −16 to 18 |
| k | −18 to 14 |
| l | −21 to 36 |
| R int | 0.0582 |
| R [F$^2$ > 2σ(F$^2$)] | 0.0508 |
| wR(F$^2$) | 0.1265 |
| S | 0.965 |
| Parameters | 471 |
| Geometrical restraints on the molecule | 96 |
| Occupational constraints on the molecule | 2 |
| Geometrical constraints on the molecule | 0 |
| Flack parameter | 0.076(15) |
| Δρ$_{max}$, e Å$^{-3}$ | 0.193 |
| Δρ$_{min}$, e Å$^{-3}$ | −0.349 |
| Crystal size, mm$^3$ | 0.110 × 0.080 × 0.080 |
| Radiation, Å | 1.54178 |
| Temperature, K | 100 |
| CCDC number | 1488938 |

Λ-MOF-520-2.

A colorless truncated octahedron-shaped crystal (60×40×40 μm$^3$) of Λ-MOF-520-2 was measured at a beamline 11.3.1 at the ALS with radiation of λ=1.0332 Å. According to intensity statistics table for the whole dataset (PRP file), the resolution was cut off to 0.84 Å. Solvent masking was applied during structure refinement. Before solvent masking instruction, structure was refined anisotropically and hydrogen atoms were placed into positions calculated geometrically. The connected asymmetric unit was defined inside the unit cell: MOVE command was applied to all atoms. The weighting scheme is refined as well as the extinction coefficient. The void volume is estimated to be 19048 Å$^3$ with 5013 electrons removed during masking. The occupancy for 2 bound molecules of methanol was constrained to 1. Some reflections were omitted due to non-ideal solvent masking, beam stop clipping and the minor presence of diffuse scattering. The threshold $(I_{obs}-I_{calc})/\sigma(W)>10$ was chosen for omitting these reflections. Omission of these reflections did not affect the refinement; the fraction of omitted reflections is less than 0.1% of the whole dataset.

TABLE S6

Crystal data, data collection, and structure refinement parameters for Λ-MOF-520-2.

| Name | Λ-MOF-520-2. |
|---|---|
| Chemical composition of MOF per asymmetric unit | Al$_4$ C$_{55}$ H$_{34}$ O$_{17}$ |

TABLE S6-continued

Crystal data, data collection, and structure refinement parameters for Λ-MOF-520-2.

| | |
|---|---|
| Chemical formula of bound molecule | $C_1H_3O_1$ |
| Bound molecule occupancy | 2 molecules of 100% |
| Formula mass | 1136.81 |
| Crystal system | Tetragonal |
| Space group | $P4_32_12$ |
| a, Å | 19.5333(8) |
| c, Å | 69.876(3) |
| V, Å$^3$ | 26661(2) |
| d, g cm$^{-3}$ | 0.566 |
| μ, mm$^{-1}$ | 0.180 |
| Z | 8 |
| Measured reflections | 201862 |
| Independent reflections | 23574 |
| Observed reflections | 20791 |
| $\theta_{min}$, ° | 2.143 |
| $\theta_{max}$, ° | 37.992 |
| h | −23 to 23 |
| k | −23 to 23 |
| l | −83 to 83 |
| R int | 0.0582 |
| R [$F^2 > 2\sigma(F^2)$] | 0.0334 |
| wR($F^2$) | 0.0853 |
| S | 0.982 |
| Parameters | 723 |
| Geometrical restraints on the molecule | 0 |
| Occupational constraints on the molecule | 2 |
| Geometrical constraints on the molecule | 0 |
| Flack parameter | 0.059(14) |
| $\Delta\rho_{max}$, e Å$^{-3}$ | 0.330 |
| $\Delta\rho_{min}$, e Å$^{-3}$ | −0.404 |
| Crystal size, mm$^3$ | 0.060 × 0.040 × 0.040 |
| Radiation, Å | 1.0332 |
| Temperature, K | 100 |
| CCDC number | 1488952 |

Δ-MOF-520-3.

A colorless truncated octahedron-shaped crystal (100× 85×85 μm$^3$) of Δ-MOF-520-3 was measured at a beamline 11.3.1 at the ALS with radiation of λ=1.23990 Å. According to intensity statistics table for the whole dataset (PRP file), the resolution was cut off to 0.97 Å. The occupancy of each ethylene glycol was found through adding a new variable and then constrained to 1.0. The occupancy of the dangling moiety of the formic acid was set to 0.4. Solvent masking was applied during structure refinement. Before solvent masking instruction, structure was refined anisotropically and hydrogen atoms were placed into positions calculated geometrically. The connected asymmetric unit was defined inside the unit cell: MOVE command was applied to all atoms. The weighting scheme is refined as well as the extinction coefficient. The void volume is estimated to be 17397 Å$^3$ with 18733 electrons removed during masking. Some reflections were omitted due to non-ideal solvent masking, beam stop clipping and the minor presence of diffuse scattering. The threshold $(I_{obs}-I_{calc})/\sigma(W)>10$ was chosen for omitting these reflections. Omission of these reflections did not affect the refinement; the fraction of omitted reflections is less than 0.1% of the whole dataset.

TABLE S7

Crystal data, data collection, and structure refinement parameters for Δ-MOF-520-3.

| | |
|---|---|
| Name | Δ-MOF-520-3 |
| Chemical composition of MOF per asymmetric unit | $Al_4 C_{54.4} H_{32.4} O_{15.4}$ |
| Chemical formula of bound molecule | $C_2H_4O_2$ |
| Bound molecule occupancy | 2 molecules of 100% |
| Formula mass | 1160.42 |

TABLE S7-continued

Crystal data, data collection, and structure refinement parameters for Δ-MOF-520-3.

| | |
|---|---|
| Crystal system | Tetragonal |
| Space group | $P4_12_12$ |
| a, Å | 18.9175(19) |
| c, Å | 71.908(7) |
| V, Å$^3$ | 25734(6) |
| d, g cm$^{-3}$ | 0.599 |
| μ, mm$^{-1}$ | 0.319 |
| Z | 8 |
| Measured reflections | 108909 |
| Independent reflections | 14339 |
| Observed reflections | 10577 |
| $\theta_{min}$, ° | 2.122 |
| $\theta_{max}$, ° | 39.274 |
| h | −19 to 19 |
| k | −19 to 19 |
| l | −73 to 73 |
| R int | 0.1373 |
| R [$F^2 > 2\sigma(F^2)$] | 0.0385 |
| wR($F^2$) | 0.0837 |
| S | 0.916 |
| Parameters | 748 |
| Geometrical restraints on the molecule | 2 |
| Occupational constraints on the molecule | 3 |
| Geometrical constraints on the molecule | 0 |
| Flack parameter | 0.10(3) |
| $\Delta\rho_{max}$, e Å$^{-3}$ | 0.156 |
| $\Delta\rho_{min}$, e Å$^{-3}$ | −0.186 |
| Crystal size, mm$^3$ | 0.100 × 0.085 × 0.085 |
| Radiation, Å | 1.2399 |
| Temperature, K | 100 |
| CCDC number | 1488943 |

Λ-MOF-520-4.

A colorless truncated octahedron-shaped crystal (80×60× 60 μm$^3$) of Λ-MOF-520-4 was measured at a beamline 11.3.1 at the ALS with radiation of λ=0.88560 Å. According to intensity statistics table for the whole dataset (PRP file), the resolution was cut off to 1.00 Å. The occupancy of each 3-nitrophenol was found through adding a new variable and then constrained to 0.65, 0.35 and 0.5 values. The occupancy of the dangling moiety of the formic acid was set to 0.5. Solvent masking was applied during structure refinement. Before solvent masking instruction, structure was refined anisotropically and hydrogen atoms were placed into positions calculated geometrically. The connected asymmetric unit was defined inside the unit cell: MOVE command was applied to all atoms. The weighting scheme is refined as well as the extinction coefficient. Once solvent masking instruction was introduced, the weight scheme was refined to convergence. The void volume is estimated to be 15573 Å$^3$ with 3598 electrons removed during masking. Some reflections were omitted due to non-ideal solvent masking, beam stop clipping and the minor presence of diffuse scattering. The threshold $(I_{obs}-I_{calc})/\sigma(W)>10$ was chosen for omitting these reflections. Omission of these reflections did not affect the refinement; the fraction of omitted reflections is less than 0.1% of the whole dataset.

TABLE S8

Crystal data, data collection, and structure refinement parameters for Λ-MOF-520-4.

| | |
|---|---|
| Name | Λ-MOF-520-4 |
| Chemical composition of MOF per asymmetric unit | $A_{14} C_{55} H_{33} O_{18}$ |
| Chemical formula of bound molecule | $C_6H_4O_3N_1$ |
| Bound molecule occupancy | 1 molecule of 65%, |
| | 1 molecule of 50%, |
| | 1 molecule of 35% |

TABLE S8-continued

Crystal data, data collection, and structure refinement parameters for Λ-MOF-520-4.

| | |
|---|---|
| Formula mass | 1296.89 |
| Crystal system | Tetragonal |
| Space group | P4$_3$2$_1$2 |
| a, Å | 19.342(5) |
| c, Å | 70.335(17) |
| V, Å$^3$ | 26312(14) |
| d, g cm$^{-3}$ | 0.655 |
| μ, mm$^{-1}$ | 0.134 |
| Z | 8 |
| Measured reflections | 120352 |
| Independent reflections | 13783 |
| Observed reflections | 12462 |
| θ$_{min}$, ° | 2.588 |
| θ$_{max}$, ° | 26.311 |
| h | −19 to 19 |
| k | −19 to 19 |
| l | −70 to 70 |
| R int | 0.0667 |
| R [F$^2$ > 2σ(F$^2$)] | 0.0560 |
| wR(F$^2$) | 0.1556 |
| S | 1.048 |
| Parameters | 965 |
| Geometrical restraints on the molecule | 70 |
| Occupational constraints on the molecule | 4 |
| Geometrical constraints on the molecule | 0 |
| Flack parameter | 0.07(4) |
| Δρ$_{max}$, e Å$^{-3}$ | 0.295 |
| Δρ$_{min}$, e Å$^{-3}$ | −0.316 |
| Crystal size, mm$^3$ | 0.080 × 0.060 × 0.060 |
| Radiation, Å | 0.88560 |
| Temperature, K | 100 |
| CCDC number | 1488945 |

Λ-MOF-520-5.

A colorless truncated octahedron-shaped crystal (90×60×60 μm$^3$) of Λ-MOF-520-5 was measured at a beamline 11.3.1 at the ALS with radiation of λ=1.23990 Å. According to intensity statistics table for the whole dataset (PRP file), the resolution was cut off to 0.80 Å. The occupancy of heptanoic acid was found to be 0.55 for the most of the structure and this occupancy value was set for the whole molecule. Solvent masking was applied during structure refinement. Before solvent masking instruction, structure was refined anisotropically and hydrogen atoms were placed into positions calculated geometrically. The connected asymmetric unit was defined inside the unit cell: MOVE command was applied to all atoms. The weighting scheme is refined as well as the extinction coefficient. Once solvent masking instruction was introduced, the weight scheme was refined to convergence. The C7G, C6G and C5G atoms are heavily overlapped with the solvent present in the crystal, so they were initially put into calculated positions using DFIX and DELU restraints. The void volume is estimated to be 8446 Å$^3$ with 5312 electrons removed during masking. Some reflections were omitted due to non-ideal solvent masking, beam stop clipping and the minor presence of diffuse scattering. The threshold (I$_{obs}$−I$_{calc}$)/σ(W)>10 was chosen for omitting these reflections. Omission of these reflections did not affect the refinement; the fraction of omitted reflections is less than 0.1% of the whole dataset.

TABLE S9

Crystal data, data collection, and structure refinement parameters for Λ-MOF-520-5.

| | |
|---|---|
| Name | Λ-MOF-520-5 |
| Chemical composition of MOF per asymmetric unit | Al$_2$ C$_{27.45}$ H$_{17}$ O$_{8.9}$ |

TABLE S9-continued

Crystal data, data collection, and structure refinement parameters for Λ-MOF-520-5.

| | |
|---|---|
| Chemical formula of bound molecule | C$_7$H$_{13}$O$_2$ |
| Bound molecule occupancy | 55% |
| Formula mass | 614.21 |
| Crystal system | Tetragonal |
| Space group | P4$_2$2$_1$2 |
| a, Å | 18.6010(6) |
| c, Å | 37.3859(13) |
| V, Å$^3$ | 12935.4(9) |
| d, g cm$^{-3}$ | 0.631 |
| μ, mm$^{-1}$ | 0.326 |
| Z | 8 |
| Measured reflections | 246186 |
| Independent reflections | 13281 |
| Observed reflections | 11445 |
| θ$_{min}$, ° | 2.695 |
| θ$_{max}$, ° | 50.900 |
| h | −23 to 23 |
| k | −23 to 23 |
| l | −46 to 46 |
| R int | 0.0699 |
| R [F$^2$ > 2σ(F$^2$)] | 0.0372 |
| wR(F$^2$) | 0.1074 |
| S | 1.024 |
| Parameters | 417 |
| Geometrical restraints on the molecule | 15 |
| Occupational constraints on the molecule | 1 |
| Geometrical constraints on the molecule | 0 |
| Flack parameter | 0.064(8) |
| Δρ$_{max}$, e Å$^{-3}$ | 0.203 |
| Δρ$_{min}$, e Å$^{-3}$ | −0.299 |
| Crystal size, mm$^3$ | 0.090 × 0.060 × 0.060 |
| Radiation, Å | 1.23990 |
| Temperature, K | 100 |
| CCDC number | 1488948 |

Δ-MOF-520-6.

A colorless truncated octahedron-shaped crystal (100×80×80 μm$^3$) of Δ-MOF-520-6 was measured at a beamline 11.3.1 at the ALS with radiation of λ=0.77490 Å. According to intensity statistics table for the whole dataset (PRP file), the resolution was cut off to 0.83 Å. The overall occupancy of 3-hydroxybenzoic acid was constrained to 1. The molecule of 3,5-diaminobenzoic acid was found to be positionally disordered. The occupancy of each part of 3-hydroxybenzoic acid was found through adding a new variable: 0.58 and 0.42, respectively Solvent masking was applied during structure refinement. Before solvent masking instruction, structure was refined anisotropically and hydrogen atoms were placed into positions calculated geometrically. The connected asymmetric unit was defined inside the unit cell: MOVE command was applied to all atoms. The weighting scheme is refined as well as the extinction coefficient. Once solvent masking instruction was introduced, the weight scheme was refined to convergence. The void volume is estimated to be 7952 Å$^3$ with 1165 electrons removed during masking. Some reflections were omitted due to non-ideal solvent masking, beam stop clipping and the minor presence of diffuse scattering. The threshold (I$_{obs}$−I$_{calc}$)/σ(W)>10 was chosen for omitting these reflections. Omission of these reflections did not affect the refinement; the fraction of omitted reflections is less than 0.1% of the whole dataset.

TABLE S10

Crystal data, data collection, and structure refinement parameters for Δ-MOF-520-6.

| | |
|---|---|
| Name | Δ-MOF-520-6 |
| Chemical composition of MOF per asymmetric unit | Al$_2$ C$_{27}$ H$_{17}$ O$_8$ |

TABLE S10-continued

Crystal data, data collection, and structure refinement parameters for Λ-MOF-520-6.

| | |
|---|---|
| Chemical formula of bound molecule | $C_7H_5O_3$ |
| Bound molecule occupancy | 100% |
| Formula mass | 660.47 |
| Crystal system | Tetragonal |
| Space group | $P4_22_12$ |
| a, Å | 18.7200(7) |
| c, Å | 36.8786(15) |
| V, Å$^3$ | 12923.7(11) |
| d, g cm$^{-3}$ | 0.679 |
| μ, mm$^{-1}$ | 0.093 |
| Z | 8 |
| Measured reflections | 168732 |
| Independent reflections | 11871 |
| Observed reflections | 9717 |
| $\theta_{min}$, ° | 2.065 |
| $\theta_{max}$, ° | 27.844 |
| h | −22 to 22 |
| k | −22 to 22 |
| l | −44 to 44 |
| R int | 0.0674 |
| R [$F^2 > 2\sigma(F^2)$] | 0.0542 |
| wR($F^2$) | 0.1569 |
| S | 1.025 |
| Parameters | 491 |
| Geometrical restraints on the molecule | 75 |
| Occupational constraints on the molecule | 1 |
| Geometrical constraints on the molecule | 0 |
| Flack parameter | 0.07(3) |
| $\Delta\rho_{max}$, e Å$^{-3}$ | 0.478 |
| $\Delta\rho_{min}$, e Å$^{-3}$ | −0.272 |
| Crystal size, mm$^3$ | 0.100 × 0.080 × 0.080 |
| Radiation, Å | 0.77490 |
| Temperature, K | 100 |
| CCDC number | 1488939 |

Λ-MOF-520-7.

A colorless truncated octahedron-shaped crystal (80×50×50 μm$^3$) of Λ-MOF-520-7 was measured at a beamline 11.3.1 at the ALS with radiation of λ=0.77490 Å. According to intensity statistics table for the whole dataset (PRP file), the resolution was cut off to 0.83 Å. The molecule of 3,5-diaminobenzoic acid was found to be positionally disordered. The occupancy of each part of 3,5-diaminobenzoic acid was found through adding a new variable and then constrained to 0.5. Solvent masking was applied during structure refinement. Before solvent masking instruction, structure was refined anisotropically and hydrogen atoms were placed into positions calculated geometrically. The connected asymmetric unit was defined inside the unit cell: MOVE command was applied to all atoms. The weighting scheme is refined as well as the extinction coefficient. Once solvent masking instruction was introduced, the weight scheme was refined to convergence. The void volume is estimated to be 8064 Å$^3$ with 1078 electrons removed during masking. Some reflections were omitted due to non-ideal solvent masking, beam stop clipping and the minor presence of diffuse scattering. The threshold $(I_{obs}-I_{calc})/\sigma(W)>10$ was chosen for omitting these reflections. Omission of these reflections did not affect the refinement; the fraction of omitted reflections is less than 0.1% of the whole dataset.

TABLE S11

Crystal data, data collection, and structure refinement parameters for Λ-MOF-520-7.

| | |
|---|---|
| Name | Λ-MOF-520-7 |
| Chemical composition of MOF per asymmetric unit | $Al_2 C_{27} H_{17} O_8$ |

TABLE S11-continued

Crystal data, data collection, and structure refinement parameters for Λ-MOF-520-7.

| | |
|---|---|
| Chemical formula of bound molecule | $C_7H_3O_2N_2$ |
| Bound molecule occupancy | 100% |
| Formula mass | 674.51 |
| Crystal system | Tetragonal |
| Space group | $P4_22_12$ |
| a, Å | 19.008(4) |
| c, Å | 36.526(7) |
| V, Å$^3$ | 13197(6) |
| d, g cm$^{-3}$ | 0.679 |
| μ, mm$^{-1}$ | 0.091 |
| Z | 8 |
| Measured reflections | 102464 |
| Independent reflections | 12073 |
| Observed reflections | 10831 |
| $\theta_{min}$, ° | 2.682 |
| $\theta_{max}$, ° | 27.864 |
| h | −22 to 22 |
| k | −22 to 22 |
| l | −43 to 44 |
| R int | 0.0727 |
| R [$F^2 > 2\sigma(F^2)$] | 0.0418 |
| wR($F^2$) | 0.1146 |
| S | 1.002 |
| Parameters | 507 |
| Geometrical restraints on the molecule | 0 |
| Occupational constraints on the molecule | 2 |
| Geometrical constraints on the molecule | 0 |
| Flack parameter | 0.06(4) |
| $\Delta\rho_{max}$, e Å$^{-3}$ | 0.165 |
| $\Delta\rho_{min}$, e Å$^{-3}$ | −0.297 |
| Crystal size, mm$^3$ | 0.080 × 0.050 × 0.050 |
| Radiation, Å | 0.77490 |
| Temperature, K | 100 |
| CCDC number | 1488954 |

Λ-MOF-520-8.

A colorless truncated octahedron-shaped crystal (110×90×90 μm$^3$) of Λ-MOF-520-7 was measured at a Bruker D-8-Venture diffractometer with radiation of λ=1.54178 Å. According to intensity statistics table for the whole dataset (PRP file), the resolution was cut off to 1.09 Å. The occupancy of trimesic acid was found through adding a new variable and then constrained to 0.75. Before solvent masking instruction, structure was refined anisotropically and hydrogen atoms were placed into positions calculated geometrically. The connected asymmetric unit was defined inside the unit cell: MOVE command was applied to all atoms. The weighting scheme is refined as well as the extinction coefficient. Once solvent masking instruction was introduced, the weight scheme was refined to convergence. The void volume is estimated to be 7995 Å$^3$ with 4902 electrons removed during masking. Some reflections were omitted due to non-ideal solvent masking, beam stop clipping and the minor presence of diffuse scattering. The threshold $(I_{obs}-I_{calc})/\sigma(W)>10$ was chosen for omitting these reflections. Omission of these reflections did not affect the refinement; the fraction of omitted reflections is less than 0.1% of the whole dataset.

TABLE S12

Crystal data, data collection, and structure refinement parameters for Λ-MOF-520-8.

| | |
|---|---|
| Name | Λ-MOF-520-8 |
| Chemical composition of MOF per asymmetric unit | $Al_2 C_{27.25} H_{17} O_{8.5}$ |
| Chemical formula of bound molecule | $C_9H_3O_6$ |
| Bound molecule occupancy | 75% |
| Formula mass | 689.70 |

TABLE S12-continued

Crystal data, data collection, and structure refinement parameters for Λ-MOF-520-8.

| | |
|---|---|
| Crystal system | Tetragonal |
| Space group | $P4_22_12$ |
| a, Å | 19.0082(15) |
| c, Å | 36.661(3) |
| V, Å$^3$ | 13246(2) |
| d, g cm$^{-3}$ | 0.692 |
| μ, mm$^{-1}$ | 0.692 |
| Z | 8 |
| Measured reflections | 28689 |
| Independent reflections | 5149 |
| Observed reflections | 3575 |
| $\theta_{min}$, ° | 2.62 |
| $\theta_{max}$, ° | 44.536 |
| h | −15 to 17 |
| k | −17 to 17 |
| l | −32 to 33 |
| R int | 0.1017 |
| R [$F^2 > 2\sigma(F^2)$] | 0.0620 |
| wR($F^2$) | 0.1573 |
| S | 0.986 |
| Parameters | 446 |
| Geometrical restraints on the molecule | 53 |
| Occupational constraints on the molecule | 1 |
| Geometrical constraints on the molecule | 0 |
| Flack parameter | 0.10(3) |
| $\Delta\rho_{max}$, e Å$^{-3}$ | 0.224 |
| $\Delta\rho_{min}$, e Å$^{-3}$ | −0.290 |
| Crystal size, mm$^3$ | 0.110 × 0.090 × 0.090 |
| Radiation, Å | 1.54178 |
| Temperature, K | 100 |
| CCDC number | 1488947 |

Λ-MOF-520-9.

A colorless truncated octahedron-shaped crystal (100× 80×80 μm$^3$) of Λ-MOF-520-9 was measured at a beamline 11.3.1 at the ALS with radiation of λ=0.95370 Å. According to intensity statistics table for the whole dataset (PRP file), the resolution was cut off to 0.83 Å. The occupancy of 4-bromophenol was found through adding a new variable and then constrained to 0.3 and 0.2. Before solvent masking instruction, structure was refined anisotropically and hydrogen atoms were placed into positions calculated geometrically. The connected asymmetric unit was defined inside the unit cell: MOVE command was applied to all atoms. The weighting scheme is refined as well as the extinction coefficient. Once solvent masking instruction was introduced, the weight scheme was refined to convergence. Since the amount of significant anomalous scatterers within the pore was not significant, the application of the solvent masking procedure was valid. The flack parameters for MOF-520-9 before solvent masking and after was within 3σ error range: before, 0.010(2) and after, 0.010(3). The void volume is estimated to be 16409 Å$^3$ with 4945 electrons removed during masking. Some reflections were omitted due to non-ideal solvent masking, beam stop clipping and the minor presence of diffuse scattering. The threshold ($I_{obs}-I_{calc}$)/σ(W)>10 was chosen for omitting these reflections. Omission of these reflections did not affect the refinement; the fraction of omitted reflections is less than 0.1% of the whole dataset.

TABLE S13

Crystal data, data collection, and structure refinement parameters for Λ-MOF-520-9.

| | |
|---|---|
| Name | Λ-MOF-520-9 |
| Chemical composition of MOF per asymmetric unit | $Al_4 C_{54.8} H_{34.6} O_{36.5}$ |

TABLE S13-continued

Crystal data, data collection, and structure refinement parameters for Λ-MOF-520-9.

| | |
|---|---|
| Chemical formula of bound molecule | $C_6H_4O_1Br_1$ |
| Bound molecule occupancy | 1 molecule with 30%, 1 molecule with 20% |
| Formula mass | 1183.15 |
| Crystal system | Tetragonal |
| Space group | $P4_32_12$ |
| a, Å | 19.1308(5) |
| c, Å | 70.677(2) |
| V, Å$^3$ | 25866.9(16) |
| d, g cm$^{-3}$ | 0.608 |
| μ, mm$^{-1}$ | 0.196 |
| Z | 8 |
| Measured reflections | 142101 |
| Independent reflections | 23641 |
| Observed reflections | 17574 |
| $\theta_{min}$, ° | 2.54 |
| $\theta_{max}$, ° | 33.04 |
| h | −23 to 21 |
| k | −24 to 24 |
| l | −90 to 90 |
| R int | 0.0904 |
| R [$F^2 > 2\sigma(F^2)$] | 0.0613 |
| wR($F^2$) | 0.1625 |
| S | 1.018 |
| Parameters | 829 |
| Geometrical restraints on the molecule | 99 |
| Occupational constraints on the molecule | 2 |
| Geometrical constraints on the molecule | 0 |
| Flack parameter | 0.10(3) |
| $\Delta\rho_{max}$, e Å$^{-3}$ | 0.440 |
| $\Delta\rho_{min}$, e Å$^{-3}$ | −0.321 |
| Crystal size, mm$^3$ | 0.100 × 0.080 × 0.080 |
| Radiation, Å | 0.95370 |
| Temperature, K | 100 |
| CCDC number | 1488953 |

Δ-MOF-520-10.

A colorless truncated octahedron-shaped crystal (70×55× 55 μm$^3$) of Δ-MOF-520-10 was measured at a beamline 11.3.1 at the ALS with radiation of λ=1.0332 Å. According to intensity statistics table for the whole dataset (PRP file), the resolution was cut off to 0.83 Å. The occupancy of diclofenac was found through adding a new variable and then constrained to 0.35. Before solvent masking instruction, structure was refined anisotropically and hydrogen atoms were placed into positions calculated geometrically. The connected asymmetric unit was defined inside the unit cell: MOVE command was applied to all atoms. The weighting scheme is refined as well as the extinction coefficient. Once solvent masking instruction was introduced, the weight scheme was refined to convergence. Since the amount of significant anomalous scatterers within the pore was not significant, the application of the solvent masking procedure was valid. The flack parameters for MOF-520-10 before solvent masking and after was within 3σ error range: before, 0.09(2) and after, 0.013(2). The void volume is estimated to be 16371 Å$^3$ with 13287 electrons removed during masking. The large value of unassigned electron density within the unit cell is due to missing of some low-angle observations. Some reflections were omitted due to non-ideal solvent masking, beam stop clipping and the minor presence of diffuse scattering. The threshold ($I_{obs}-I_{calc}$)/σ(W)>10 was chosen for omitting these reflections. Omission of these reflections did not affect the refinement; the fraction of omitted reflections is less than 0.1% of the whole dataset.

TABLE S14

Crystal data, data collection, and structure refinement parameters for Δ-MOF-520-10.

| Name | Δ-MOF-520-10 |
|---|---|
| Chemical composition of MOF per asymmetric unit | $Al_4 C_{55.3} H_{34} O_{18.3}$ |
| Chemical formula of bound molecule | $C_{14}H_{10}O_2N_1Cl_2$ |
| Bound molecule occupancy | 35% |
| Formula mass | 1202.44 |
| Crystal system | Tetragonal |
| Space group | $P4_12_12$ |
| a, Å | 19.0123(9) |
| c, Å | 71.393(4) |
| V, Å$^3$ | 25806(3) |
| d, g cm$^{-3}$ | 0.619 |
| μ, mm$^{-1}$ | 0.232 |
| Z | 8 |
| Measured reflections | 214744 |
| Independent reflections | 23593 |
| Observed reflections | 15541 |
| $\theta_{min}$, ° | 2.202 |
| $\theta_{max}$, ° | 38.503 |
| h | −22 to 22 |
| k | −22 to 22 |
| l | −85 to 85 |
| R int | 0.1020 |
| R [$F^2 > 2\sigma(F^2)$] | 0.0532 |
| wR($F^2$) | 0.1355 |
| S | 1.050 |
| Parameters | 856 |
| Geometrical restraints on the molecule | 120 |
| Occupational constraints on the molecule | 1 |
| Geometrical constraints on the molecule | 0 |
| Flack parameter | 0.13(2) |
| Δρ$_{max}$, e Å$^{-3}$ | 0.335 |
| Δρ$_{min}$, e Å$^{-3}$ | −0.227 |
| Crystal size, mm$^3$ | 0.070 × 0.055 × 0.055 |
| Radiation, Å | 1.0332 |
| Temperature, K | 100 |
| CCDC number | 1488942 |

TABLE S15

Crystal data, data collection, and structure refinement parameters for Δ-MOF-520-2-11.

| Name | Δ-MOF-520-2-11 |
|---|---|
| Chemical composition of MOF per asymmetric unit | $Al_4 C_{56} H_{37.4} O_{19}$ |
| Chemical formula of bound molecule | $C_{15}H_9O_5$ |
| Bound molecule occupancy | 40% |
| Formula mass | 1229.46 |
| Crystal system | Tetragonal |
| Space group | $P4_12_12$ |
| a, Å | 19.3467(7) |
| c, Å | 70.207(3) |
| V, Å$^3$ | 26278(2) |
| d, g cm$^{-3}$ | 0.622 |
| μ, mm$^{-1}$ | 0.325 |
| Z | 8 |
| Measured reflections | 152095 |
| Independent reflections | 19266 |
| Observed reflections | 13969 |
| $\theta_{min}$, ° | 2.097 |
| $\theta_{max}$, ° | 43.945 |
| h | −21 to 21 |
| k | −21 to 21 |
| l | −78 to 78 |
| R int | 0.0717 |
| R [$F^2 > 2\sigma(F^2)$] | 0.0516 |
| wR($F^2$) | 0.1412 |
| S | 1.081 |
| Parameters | 914 |
| Geometrical restraints on the molecule | 147 |
| Occupational constraints on the molecule | 4 |
| Geometrical constraints on the molecule | 0 |
| Flack parameter | 0.144(16) |
| Δρ$_{max}$, e Å$^{-3}$ | 0.222 |
| Δρ$_{min}$, e Å$^{-3}$ | −0.319 |
| Crystal size, mm$^3$ | 0.085 × 0.055 × 0.055 |
| Radiation, Å | 1.2398 |
| Temperature, K | 100 |
| CCDC number | 1488941 |

Δ-MOF-520-2-11.

A colorless truncated octahedron-shaped crystal (85×55×55 μm$^3$) of Δ-MOF-520-2-11 was measured at a beamline 11.3.1 at the ALS with radiation of λ=1.2398 Å. According to intensity statistics table for the whole dataset (PRP file), the resolution was cut off to 0.89 Å. The occupancy of genistein was found through adding a new variable and then constrained to 0.40. The occupancy of 2 molecules of methanol was constrained to 0.50. The occupancy of dangling moiety was constrained to 0.40. Before solvent masking instruction, structure was refined anisotropically and hydrogen atoms were placed into positions calculated geometrically. After refining the framework anisotropically, 11 was found initially assigning C1G and C2G carbons in the electron density difference map. The connected asymmetric unit was defined inside the unit cell: MOVE command was applied to all atoms. The weighting scheme is refined as well as the extinction coefficient. Once solvent masking instruction was introduced, the weight scheme was refined to convergence. The FLAT command was used to set the planar geometry for part of the bound molecule. The void volume is estimated to be 16326 Å$^3$ with 12794 electrons removed during masking. The large value of unassigned electron density within the unit cell is due to missing of some low-angle observations. Some reflections were omitted due to non-ideal solvent masking, beam stop clipping and the minor presence of diffuse scattering. The threshold $(I_{obs} - I_{calc})/\sigma(W) > 10$ was chosen for omitting these reflections. Omission of these reflections did not affect the refinement; the fraction of omitted reflections is less than 0.1% of the whole dataset.

Λ-MOF-520-12.

A colorless truncated octahedron-shaped crystal (90×60×60 μm$^3$) of Λ-MOF-520-9 was measured at a beamline 11.3.1 at the ALS with radiation of λ=1.2398 Å. According to intensity statistics table for the whole dataset (PRP file), the resolution was cut off to 1.00 Å. The occupancy of Boc-(RS)-3-amino-1,2-propanediol was found through adding a new variable and then constrained to 0.80. Before solvent masking instruction, structure was refined anisotropically and hydrogen atoms were placed into positions calculated geometrically. The connected asymmetric unit was defined inside the unit cell: MOVE command was applied to all atoms. The weighting scheme is refined as well as the extinction coefficient. Once solvent masking instruction was introduced, the weight scheme was refined to convergence. The tert-butyl part of the bound molecule was found to be disordered and overlapped with solvent, so DFIX command was used to fix the geometry this fragment. The void volume is estimated to be 7968 Å$^3$ with 3223. Some reflections were omitted due to non-ideal solvent masking, beam stop clipping and the minor presence of diffuse scattering. The threshold $(I_{obs} - I_{calc})/\sigma(W) > 10$ was chosen for omitting these reflections. Omission of these reflections did not affect the refinement; the fraction of omitted reflections is less than 0.1% of the whole dataset.

TABLE S16

Crystal data, data collection, and structure refinement parameters for Λ-MOF-520-12.

| Name | Λ-MOF-520-12 |
|---|---|
| Chemical composition of MOF per asymmetric unit | $Al_2 C_{27} H_{16} O_{7.4}$ |

TABLE S16-continued

Crystal data, data collection, and structure refinement parameters for Λ-MOF-520-12.

| | |
|---|---|
| Chemical formula of bound molecule | $C_8H_{15}O_4N_1$ |
| Bound molecule occupancy | 80% |
| Formula mass | 664.12 |
| Crystal system | Tetragonal |
| Space group | $P4_22_12$ |
| a, Å | 19.5071(9) |
| c, Å | 34.2595(18) |
| V, Å$^3$ | 13036.7(14) |
| d, g cm$^{-3}$ | 0.677 |
| μ, mm$^{-1}$ | 0.339 |
| Z | 8 |
| Measured reflections | 80057 |
| Independent reflections | 6854 |
| Observed reflections | 6065 |
| $\theta_{min}$, ° | 2.576 |
| $\theta_{max}$, ° | 38.336 |
| h | −19 to 19 |
| k | −19 to 19 |
| l | −34 to 34 |
| R int | 0.0431 |
| R [$F^2 > 2\sigma(F^2)$] | 0.0523 |
| wR($F^2$) | 0.1489 |
| S | 1.024 |
| Parameters | 446 |
| Geometrical restraints on the molecule | 9 |
| Occupational constraints on the molecule | 1 |
| Geometrical constraints on the molecule | 0 |
| Flack parameter | 0.040(15) |
| $\Delta\rho_{max}$, e Å$^{-3}$ | 0.209 |
| $\Delta\rho_{min}$, e Å$^{-3}$ | −0.240 |
| Crystal size, mm$^3$ | 0.090 × 0.060 × 0.060 |
| Radiation, Å | 1.2398 |
| Temperature, K | 100 |
| CCDC number | 1488949 |

Λ-MOF-520-3-13.

A colorless truncated octahedron-shaped crystal (80×55×55 μm$^3$) of Λ-MOF-520-3-13 was measured at a beamline 11.3.1 at the ALS with radiation of λ=1.03320 Å. According to intensity statistics table for the whole dataset (PRP file), the resolution was cut off to 0.70 Å. The occupancy of gibberellin A1 was found through adding a new variable and then constrained to 0.30. Before solvent masking instruction, structure was refined anisotropically and hydrogen atoms were placed into positions calculated geometrically. The connected asymmetric unit was defined inside the unit cell: MOVE command was applied to all atoms. The weighting scheme is refined as well as the extinction coefficient. All the geometrical restraints on non-hydrogen atoms of the bound molecule were removed before the solvent masking procedure. At the end of the refinement cycles, the value of the largest ratio of the final least-squares parameter shift to the final standard uncertainty was 0, indicating the structure to be in the global minimum. Once solvent masking instruction was introduced, the weight scheme was refined to convergence. The FREE command was used to remove the connectivity due to partial overlap of two molecules within the asymmetric unit. The void volume is estimated to be 6432 Å$^3$ with 2832 electrons removed during masking. Some reflections were omitted due to non-ideal solvent masking, beam stop clipping and the minor presence of diffuse scattering. The threshold ($I_{obs}-I_{calc}$)/σ(W)>10 was chosen for omitting these reflections. Omission of these reflections did not affect the refinement; the fraction of omitted reflections is less than 0.1% of the whole dataset. Note that no geometrical restraints or constraints were applied to the final structure after solvent masking procedure.

TABLE S17

Crystal data, data collection, and structure refinement parameters for Λ-MOF-520-3-13.

| | |
|---|---|
| Name | Λ-MOF-520-3-13 |
| Chemical composition of MOF per asymmetric unit | $Al_2 C_{27.7} H_{16} O_{9.4}$ |
| Chemical formula of bound molecule | $C_{19}H_{23}O_6$ |
| Bound molecule occupancy | 30% |
| Formula mass | 658.38 |
| Crystal system | Tetragonal |
| Space group | $P4_22_12$ |
| a, Å | 18.0631(8) |
| c, Å | 37.9654(16) |
| V, Å$^3$ | 12387.2(12) |
| d, g cm$^{-3}$ | 0.706 |
| μ, mm$^{-1}$ | 0.212 |
| Z | 8 |
| Measured reflections | 289571 |
| Independent reflections | 18927 |
| Observed reflections | 15661 |
| $\theta_{min}$, ° | 2.263 |
| $\theta_{max}$, ° | 47.596 |
| h | −25 to 25 |
| k | −25 to 25 |
| l | −52 to 54 |
| R int | 0.0427 |
| R [$F^2 > 2\sigma(F^2)$] | 0.0568 |
| wR($F^2$) | 0.1729 |
| S | 1.082 |
| Parameters | 563 |
| Geometrical restraints on the molecule | 0 |
| Occupational constraints on the molecule | 1 |
| Geometrical constraints on the molecule | 0 |
| Flack parameter | 0.063(9) |
| $\Delta\rho_{max}$, e Å$^{-3}$ | 0.460 |
| $\Delta\rho_{min}$, e Å$^{-3}$ | −0.307 |
| Crystal size, mm$^3$ | 0.080 × 0.055 × 0.055 |
| Radiation, Å | 1.0332 |
| Temperature, K | 100 |
| CCDC number | 1488950 |

Λ-MOF-520-3-14.

A colorless truncated octahedron-shaped crystal (80×65×65 μm$^3$) of Λ-MOF-520-3-14 was measured at a beamline 11.3.1 at the ALS with radiation of λ=0.8856 Å. According to intensity statistics table for the whole dataset (PRP file), the resolution was cut off to 0.76 Å. The occupancy of gibberellin A3 was found through adding a new variable and then constrained to 0.30. The occupancy of ethylene glycol molecule was set to 0.50. Before solvent masking instruction, structure was refined anisotropically and hydrogen atoms were placed into positions calculated geometrically. The connected asymmetric unit was defined inside the unit cell: MOVE command was applied to all atoms. The weighting scheme is refined as well as the extinction coefficient. All the geometrical restraints on non-hydrogen atoms of the bound molecule were removed before the solvent masking procedure. At the end of the refinement cycles, the value of the largest ratio of the final least-squares parameter shift to the final standard uncertainty was 0, indicating the structure to be in the global minimum. Once solvent masking instruction was introduced, the weight scheme was refined to convergence. The FREE command was used to remove the connectivity due to partial overlap of two molecules within the asymmetric unit. The void volume is estimated to be 6633 Å$^3$ with 1488 electrons removed during masking. Some reflections were omitted due to non-ideal solvent masking, beam stop clipping and the minor presence of diffuse scattering. The threshold ($I_{obs}-I_{calc}$)/σ(W)>10 was chosen for omitting these reflections. Omission of these reflections did not affect the refinement; the fraction of omitted reflections is less than 0.1% of the whole dataset.

TABLE S18

Crystal data, data collection, and structure refinement parameters for Λ-MOF-520-3-14.

| | |
|---|---|
| Name | Λ-MOF-520-3-14 |
| Chemical composition of MOF per asymmetric unit | $Al_2 C_{28.7} H_{16} O_{9.4}$ |
| Chemical formula of bound molecule | $C_{19}H_{21}O_6$ |
| Bound molecule occupancy | 30% |
| Formula mass | 669.79 |
| Crystal system | Tetragonal |
| Space group | $P4_22_12$ |
| a, Å | 18.6064(8) |
| c, Å | 37.2099(18) |
| V, Å$^3$ | 12882.0(13) |
| d, g cm$^{-3}$ | 0.691 |
| μ, mm$^{-1}$ | 0.134 |
| Z | 8 |
| Measured reflections | 164629 |
| Independent reflections | 15378 |
| Observed reflections | 10565 |
| $\theta_{min}$, ° | 2.362 |
| $\theta_{max}$, ° | 35.660 |
| h | −24 to 24 |
| k | −24 to 24 |
| l | −48 to 48 |
| R int | 0.0605 |
| R [$F^2 > 2\sigma(F^2)$] | 0.0580 |
| wR($F^2$) | 0.1604 |
| S | 0.942 |
| Parameters | 582 |
| Geometrical restraints on the molecule | 0 |
| Occupational constraints on the molecule | 2 |
| Geometrical constraints on the molecule | 0 |
| Flack parameter | 0.05(2) |
| Δρ$_{max}$, e Å$^{-3}$ | 0.358 |
| Δρ$_{min}$, e Å$^{-3}$ | −0.232 |
| Crystal size, mm$^3$ | 0.080 × 0.065 × 0.065 |
| Radiation, Å | 0.8856 |
| Temperature, K | 100 |
| CCDC number | 1488946 |

Δ-MOF-520-15.

A colorless truncated octahedron-shaped crystal (60×40×40 μm$^3$) of Δ-MOF-520-15. was measured at a beamline 11.3.1 at the ALS with radiation of λ=1.03330 Å. According to intensity statistics table for the whole dataset (PRP file), the resolution was cut off to 0.80 Å. The occupancy of (−)-jasmonic acid was found through adding a new variable and then constrained to 0.33. Before solvent masking instruction, structure was refined anisotropically and hydrogen atoms were placed into positions calculated geometrically. The connected asymmetric unit was defined inside the unit cell: MOVE command was applied to all atoms. The weighting scheme is refined as well as the extinction coefficient. Once solvent masking instruction was introduced, the weight scheme was refined to convergence. Last three carbon atoms of the bound molecule (C12G, C11G and C10G) are heavily overlapped with solvent molecule so they were placed initially into geometrically calculated positions. DFIX and DANG commands were used to set the geometry of this fragment. The void volume is estimated to be 7465 Å$^3$ with 3732 electrons removed during masking. Some reflections were omitted due to non-ideal solvent masking, beam stop clipping and the minor presence of diffuse scattering. The threshold ($I_{obs}-I_{calc})\sigma(W)>10$ was chosen for omitting these reflections. Omission of these reflections did not affect the refinement; the fraction of omitted reflections is less than 0.1% of the whole dataset.

TABLE S19

Crystal data, data collection, and structure refinement parameters for Δ-MOF-520-15.

| | |
|---|---|
| Name | Δ-MOF-520-15 |
| Chemical composition of MOF per asymmetric unit | $Al_2 C_{27.67} H_{17} O_{9.34}$ |
| Chemical formula of bound molecule | $C_{12}H_{17}O_3$ |
| Bound molecule occupancy | 33% |
| Formula mass | 622.40 |
| Crystal system | Tetragonal |
| Space group | $P4_22_12$ |
| a, Å | 18.5251(7) |
| c, Å | 37.4577(15) |
| V, Å$^3$ | 12854.7(11) |
| d, g cm$^{-3}$ | 0.642 |
| μ, mm$^{-1}$ | 0.197 |
| Z | 8 |
| Measured reflections | 318021 |
| Independent reflections | 13161 |
| Observed reflections | 12455 |
| $\theta_{min}$, ° | 2.248 |
| $\theta_{max}$, ° | 40.224 |
| h | −24 to 24 |
| k | −24 to 24 |
| l | −49 to 49 |
| R int | 0.0417 |
| R [$F^2 > 2\sigma(F^2)$] | 0.0474 |
| wR($F^2$) | 0.1430 |
| S | 1.046 |
| Parameters | 472 |
| Geometrical restraints on the molecule | 8 |
| Occupational constraints on the molecule | 1 |
| Geometrical constraints on the molecule | 0 |
| Flack parameter | 0.037(8) |
| Δρ$_{max}$, e Å$^{-3}$ | 0.583 |
| Δρ$_{min}$, e Å$^{-3}$ | −0.322 |
| Crystal size, mm$^3$ | 0.060 × 0.040 × 0.040 |
| Radiation, Å | 1.0333 |
| Temperature, K | 100 |
| CCDC number | 1488940 |

Λ-MOF-520-16.

A colorless truncated octahedron-shaped crystal (60×40×40 μm$^3$) of Λ-MOF-520-16 was measured at a beamline 11.3.1 at the ALS with radiation of λ=1.03330 Å. According to intensity statistics table for the whole dataset (PRP file), the resolution was cut off to 0.80 Å. The occupancy of (+)-jasmonic acid was found through adding a new variable and then constrained to 0.33 Before solvent masking instruction, structure was refined anisotropically and hydrogen atoms were placed into positions calculated geometrically. The connected asymmetric unit was defined inside the unit cell: MOVE command was applied to all atoms. The weighting scheme is refined as well as the extinction coefficient. Once solvent masking instruction was introduced, the weight scheme was refined to convergence. Last three carbon atoms of the bound molecule (C12G, C11G and C10G) are heavily overlapped with solvent molecule so they were placed initially into geometrically calculated positions. DFIX and DANG commands were used to set the geometry of this fragment. ISOR command was used to restrain the thermal parameters of these carbon atoms. The void volume is estimated to be 7652 Å$^3$ with 3862 electrons removed during masking. Some reflections were omitted due to non-ideal solvent masking, beam stop clipping and the minor presence of diffuse scattering. The threshold ($I_{obs}-I_{calc})/\sigma(W)>10$ was chosen for omitting these reflections. Omission of these reflections did not affect the refinement; the fraction of omitted reflections is less than 0.1% of the whole dataset.

TABLE S20

Crystal data, data collection, and structure refinement parameters for Λ-MOF-520-16.

| Name | Λ-MOF-520-16 |
|---|---|
| Chemical composition of MOF per asymmetric unit | $Al_2 C_{27.67} H_{17} O_{9.34}$ |
| Chemical formula of bound molecule | $C_{12}H_{17}O_3$ |
| Bound molecule occupancy | 33% |
| Formula mass | 622.40 |
| Crystal system | Tetragonal |
| Space group | $P4_22_12$ |
| a, Å | 18.7304(7) |
| c, Å | 37.2104(15) |
| V, Å$^3$ | 13054.4(11) |
| d, g cm$^{-3}$ | 0.632 |
| μ, mm$^{-1}$ | 0.194 |
| Z | 8 |
| Measured reflections | 359086 |
| Independent reflections | 13361 |
| Observed reflections | 12453 |
| $\theta_{min}$, ° | 2.236 |
| $\theta_{max}$, ° | 40.223 |
| h | −28 to 28 |
| k | −28 to 28 |
| l | −56 to 56 |
| R int | 0.0526 |
| R [$F^2 > 2\sigma(F^2)$] | 0.0460 |
| wR($F^2$) | 0.1400 |
| S | 1.084 |
| Parameters | 472 |
| Geometrical restraints on the molecule | 50 |
| Occupational constraints on the molecule | 1 |
| Geometrical constraints on the molecule | 0 |
| Flack parameter | 0.040(8) |
| $\Delta\rho_{max}$, e Å$^{-3}$ | 0.454 |
| $\Delta\rho_{min}$, e Å$^{-3}$ | −0.289 |
| Crystal size, mm$^3$ | 0.060 × 0.040 × 0.040 |
| Radiation, Å | 1.0333 |
| Temperature, K | 100 |
| CCDC number | 1488955 |

REFERENCES AND NOTES

1. A. Holden, P. Morrison, *Crystals and Crystal Growing*. (London, 1982).
2. J. L. Atwood, J. E. D. Davies, D. D. MacNicol, *Inclusion Compounds: Structural aspects of inclusion compounds formed by inorganic and organometallic host lattices*. (Academic Press, 1984).
3. Y.-M. Legrand, A. van der Lee, M. Barboiu, Single-Crystal X-ray Structure of 1,3-Dimethylcyclobutadiene by Confinement in a Crystalline Matrix. *Science* 329, 299 (2010).
4. Y. Inokuma, S. Yoshioka, J. Ariyoshi, T. Arai, Y. Hitora, K. Takada, S. Matsunaga, K. Rissanen, M. Fujita, X-ray analysis on the nanogram to microgram scale using porous complexes. *Nature* 495, 461 (2013).
5. H. Furukawa, K. E. Cordova, M. O'Keeffe, O. M. Yaghi, The Chemistry and Applications of Metal-Organic Frameworks. *Science* 341, 974 (2013).
6. H. D. Flack, G. Bernardinelli, Absolute structure and absolute configuration. *Acta Crystallogr. A* 55, 908 (1999).
7. S. Yoshioka, Y. Inokuma, M. Hoshino, T. Sato, M. Fujita, Absolute structure determination of compounds with axial and planar chirality using the crystalline sponge method. *Chem. Sci.* 6, 3765 (2015).
8. E. Sanna, E. C. Escudero-Adan, A. Bauza, P. Ballester, A. Frontera, C. Rotger, A. Costa, A crystalline sponge based on dispersive forces suitable for X-ray structure determination of included molecular guests. *Chem. Sci.* 6, 5466 (2015).
9. M. Hoshino, A. Khutia, H. Xing, Y. Inokuma, M. Fujita, The crystalline sponge method updated. *IUCrJ* 3, 139 (2016).
10. F. Gándara, H. Furukawa, S. Lee, O. M. Yaghi, High Methane Storage Capacity in Aluminum Metal—Organic Frameworks. *J. Am. Chem. Soc.* 136, 5271 (2014).
11. H. D. Flack, G. Bernardinelli, Reporting and evaluating absolute-structure and absolute-configuration determinations. *J. Appl. Crystallogr.* 33, 1143 (2000).
12. Materials and methods are available as supplementary materials at the AAAS website for the corresponding Science publication.
13. T. R. Ramadhar, S.-L. Zheng, Y.-S. Chen, J. Clardy, Analysis of rapidly synthesized guest-filled porous complexes with synchrotron radiation: practical guidelines for the crystalline sponge method. *Acta Crystallogr. A* 71, 46 (2015).
14. H. D. Flack, G. Bernardinelli, D. A. Clemente, A. Linden, A. L. Spek, Centrosymmetric and pseudo-centrosymmetric structures refined as non-centrosymmetric. *Acta Crystallogr. B* 62, 695 (2006).
15. H. D. Flack, U. Shmueli, The mean-square Friedel intensity difference in P1 with a centrosymmetric substructure. *Acta Crystallogr. A* 63, 257 (2007).
16. J. M. Bijvoet, A. F. Peerdeman, A. J. van Bommel, Determination of the Absolute Configuration of Optically Active Compounds by Means of X-Rays. *Nature* 168, 271 (1951).
17. R. K. Hill, A. G. Edwards, The absolute configuration of methyl jasmonate. *Tetrahedron* 21, 1501 (1965).
18. G. Sheldrick, A short history of SHELX. *Acta Crystallogr. A* 64, 112 (2008).
19. O. V. Dolomanov, L. J. Bourhis, R. J. Gildea, J. A. K. Howard, H. Puschmann, OLEX2: a complete structure solution, refinement and analysis program. *J. Appl. Crystallogr.* 42, 339 (2009).
20. C. F. Macrae, P. R. Edgington, P. McCabe, E. Pidcock, G. P. Shields, R. Taylor, M. Towler, J. van de Streek, Mercury: visualization and analysis of crystal structures. *J. Appl. Crystallogr.* 39, 453 (2006).
21. B. Rees, L. Jenner, M. Yusupov, Bulk-solvent correction in large macromolecular structures. *Acta Crystallogr. D* 61, 1299 (2005).
22. A. L. Spek, PLATON SQUEEZE: a tool for the calculation of the disordered solvent contribution to the calculated structure factors. *Acta Crystallogr. C* 71, 9 (2015).

The invention claimed is:

1. A method of coordinative alignment (CAL) to determine the structure and absolute configuration of target molecules, comprising coordinative aligning and crystallizing the target molecules within a chiral metal organic framework (MOF), wherein:
   (i) the target molecules bind to the interior of the MOF through covalent and/or ionic bonds, and are oriented in pores of the MOF such that reduced vibrations and restricted orientations by the bonds enable structural determination of the oriented target molecules by diffraction analysis like single crystal x-ray diffraction;
   (ii) chiral symmetry of the MOF serves as a reference for determining the absolute configuration of the bound target molecules, such that the chiral environment of the pore enables enantioselective crystallization of the target molecules in the pores, which can be applied to crystallize one enantiomer from a recemic mixture;
   (iii) the MOF provides sufficiently large single crystals so that the crystals diffract enough for the structure determination, and functionalities that can interact with target molecules, including open metal sites and organic functional groups, sufficient to make the covalent and/or ionic bonds with the target molecules; and (iv) the target molecules are chiral, are of size to be bound within the pores of the MOF, and comprise organic functional groups sufficient to make the covalent and/or ionic bonds with the MOF.

2. The method of claim 1 wherein the functional groups of the target molecules are selected from carboxylic acid, primary alcohol, vicinal diol, and phenol.

3. The method of claim 2 wherein the MOF is selected from:
   a) MOF-74, MOF-808, PCN-700, MOF-545, and MOF-535;
   b) chiral MOF-5 and $Co_2(R-man)_2(bpy)_3](NO_3)_2$; and
   c) MOF-520, $Al8(\mu-OH)8(HCOO)4(BTB)4$, (BTB=1,3,5-benzenetribenzoate).

4. The method of claim 3 wherein the method further comprises crystallizing the one enantiomer from the recemic mixture.

5. The method of claim 3 wherein the method further comprises irradiating the MOF and the coordinative aligned target molecules with an incident beam, sufficient to produce a diffraction pattern for the target molecules.

6. The method of claim 2 wherein the MOF is MOF-520, $Al_8(\mu-OH)_8(HCOO)_4(BTB)_4$, (BTB=1,3,5-benzenetribenzoate).

7. The method of claim 1 wherein the target molecules are selected from: benzoic acid, methanol, ethylene glycol, 3-nitrophenol, heptanoic acid, 3-hydroxybenzoic acid, 3,5-diaminobenzoic acid, trimesic acid, 4-bromophenol, 2-(2,6-dichloranilino)phenylacetic acid (diclofenac), 5,7-dihydroxy-3-(4-hydroxyphenyl)chromen-4-one (genistein), tert-butyloxycarbonyl-(RS)-3-amino-1,2-propanediol, gibberellin form $A_1$ and $A_3$, and (±)-jasmonic acid.

8. The method of claim 7 wherein the MOF is selected from:
   a) MOF-74, MOF-808, PCN-700, MOF-545, and MOF-535;
   b) chiral MOF-5 and $Co_2(R-man)_2(bpy)_3](NO_3)_2$; and
   c) MOF-520, $Al8(\mu-OH)8(HCOO)4(BTB)4$, (BTB=1,3,5-benzenetribenzoate).

9. The method of claim 8 wherein the method further comprises crystallizing the one enantiomer from the recemic mixture.

10. The method of claim 8 wherein the method further comprises irradiating the MOF and the coordinative aligned target molecules with an incident beam, sufficient to produce a diffraction pattern for the target molecules.

11. The method of claim 7 wherein the MOF is MOF-520, $Al_8(\mu-OH)_8(HCOO)_4(BTB)_4$, (BTB=1,3,5-benzenetribenzoate).

12. The method of claim 7 wherein the method further comprises crystallizing the one enantiomer from the recemic mixture.

13. The method of claim 7 wherein the method further comprises irradiating the MOF and the coordinative aligned target molecules with an incident beam, sufficient to produce a diffraction pattern for the target molecules.

14. The method of claim 1 wherein the MOF is selected from:
   a) MOF-74, MOF-808, PCN-700, MOF-545, and MOF-535;
   b) chiral MOF-5 and $Co_2(R-man)_2(bpy)_3](NO_3)_2$; and
   c) MOF-520, $Al_8(\mu-OH)_8(HCOO)_4(BTB)_4$, (BTB=1,3,5-benzenetribenzoate).

15. The method of claim 14 wherein the method further comprises crystallizing the one enantiomer from the recemic mixture.

16. The method of claim 14 wherein the method further comprises irradiating the MOF and the coordinative aligned target molecules with an incident beam sufficient to produce a diffraction pattern for the target molecules.

17. The method of claim 1 wherein the MOF is MOF-520, $Al_8(\mu-OH)_8(HCOO)_4(BTB)_4$, (BTB=1,3,5-benzenetribenzoate).

18. The method of claim 1 wherein the MOF is MOF-520, $Al_8(\mu-OH)_8(HCOO)_4(BTB)_4$, (BTB=1,3,5-benzenetribenzoate), the functional groups of the target molecules are carboxylic acid, and the target molecules are gibberellin form $A_1$.

19. The method of claim 1 wherein the method further comprises crystallizing the one enantiomer from the recemic mixture.

20. The method of claim 1 wherein the method further comprises irradiating the MOF and the coordinative aligned target molecules with an incident beam, sufficient to produce a diffraction pattern for the target molecules.

* * * * *